United States Patent [19]

Taylor

[11] Patent Number: 5,604,851
[45] Date of Patent: Feb. 18, 1997

[54] METHOD AND APPARATUS FOR CONSTRUCTING DISPLAYS OF PARTIALLY ORDERED DATA

[75] Inventor: David J. Taylor, Waterloo, Canada

[73] Assignee: International Business Machines Corporation, Armonk, N.Y.

[21] Appl. No.: 449,854

[22] Filed: May 24, 1995

[30] Foreign Application Priority Data

Jul. 29, 1994 [CA] Canada ............................ 2129190

[51] Int. Cl.$^6$ ............................................. G06F 15/00
[52] U.S. Cl. ................................................. 395/140
[58] Field of Search .................................... 395/140, 141, 395/155, 161; 345/117, 118

[56] References Cited

U.S. PATENT DOCUMENTS 5,440,675  8/1995  Matsunaga et al. ............... 395/140
5,450,535  12/1995  North ................................. 395/140
5,481,668  1/1996  Marcus .............................. 395/161

Primary Examiner—Phu K. Nguyen
Attorney, Agent, or Firm—Sterne, Kessler, Goldstein & Fox P.L.L.C.

[57] ABSTRACT

A method and apparatus for constructing displays of partially ordered information for event tracing and debugging from systems exhibiting concurrent processing characteristics, such as distributed systems. The method and apparatus provide displays wherein the information is maintained in the partial order while allowing intuitive scrolling of the information on the display through the implementation of predefined unidirectional movement, monotonicity, priority, maximal display and minimal change constraints. The arrangement of the information on the display may be changed by the user and appropriate labels and identifiers can be included as desired. The information may also be grouped into clusters to reduce clutter on the display, allowing information of particular interest to be examined more easily.

42 Claims, 14 Drawing Sheets

METHOD AND APPARATUS FOR CONSTRUCTING DISPLAYS OF PARTIALLY ORDERED DATA

BACKGROUND OF THE INVENTION

FIELD OF THE INVENTION

The present invention relates to a method of constructing useful displays of partially ordered information. More specifically, the present invention relates to a method of constructing a display of partially ordered information from distributed systems and other types of systems with parallel or concurrent processing characteristics to assist a user in understanding and/or debugging such systems. The present invention also relates to a display system for displaying partially ordered information and, more specifically, to a display system to assist a user in understanding and/or debugging distributed systems and other types of systems with parallel or concurrent processing characteristics.

DESCRIPTION OF THE PRIOR ART

Debuggers for sequential programs are known. Such debuggers typically gather and display information which may be useful in determining the location and/or cause of errors (bugs) in a program. Debugging information may include the values assigned to variables at various points in the execution of the program and/or the execution path of the program (which functions are entered and exited at which times or which program instructions are being executed), etc.

However, debuggers designed for use with sequential programs are not very suitable for use with programs executing concurrently, such as on distributed systems. Unlike sequential systems wherein a program is sequentially executed, one instruction after another, programs executing on parallel or distributed systems typically comprise one or more processes each of which may be performed concurrently. These processes may interact with one another either synchronously, asynchronously or both, and these interactions and failed interactions, typically referred to as "events", form an important part of the information required to understand and/or debug a program executing on such a system. Similar problems can arise in attempting to trace events in other types of computing environments exhibiting concurrent processing characteristics.

Adding the capacity to known sequential debuggers to deal with these events is not a simple task as, unlike the sequential case, a concurrent system does not have a "total order" of events. Specifically, as processes in either a parallel or distributed system may execute concurrently and under different clocks (especially in geographically distributed systems), there is no simple, absolute, sequential order (total order) which may be assigned to the events. At best, the order of events within a process and the inter-relationship between events in different processes may be defined as a partial order, i.e. event A preceded event B as event B could not start until event A was completed, either because the events are directly related or because of a relationship between the events and one or more other events. A simple example of this may be that event A is responsible for creating a file on a storage medium while event B is responsible for reading the contents of that file.

Unfortunately, while prior attempts have been made to produce debuggers suitable for use with concurrent systems, in these prior art systems the display of partially ordered debugging information has been non-intuitive and often misleading to the user.

SUMMARY OF THE INVENTION

It is an object of the present invention to provide a novel method of constructing a display of partially ordered information. It is a further object of the present invention to provide a novel display system for partially ordered information.

According to one aspect of the present invention, there is provided a method of constructing a display of partially ordered information comprising a plurality of synchronous and/or asynchronous events, at least some of these events each being related to a different other event to form an event pair and each event being associated with one of a plurality of processes, the information being displayed on a display with opposed first and second boundaries, the method comprising the steps of:

(i) identifying and locating an event of interest on the display adjacent the first boundary, the first boundary defining a datum point in the partial order and the second boundary defining a traversal direction extending from the datum to the second boundary for traversing the partial order;

(ii) creating a set S to represent events to be considered for placement on the display and setting S to comprise the event of interest;

(iii) defining an operation direction equivalent to said traversal direction;

(iv) for each event in S, adding its partner event to S if: said event is a synchronous event or if said partner event is an asynchronous event succeeding said event in the partial order with respect to the operation direction and said partner event does not precede, with respect to the traversal direction, any first event on the previously completed display; and either the process to which the partner event is associated with is currently not in S or the event in said process already in S succeeds the partner event in the partial order with respect to the operation direction;

(v) determining events in S for which no other event in S precedes them in the partial order with respect to the operation direction and placing said events into a set T;

(vi) displaying each event in T on the display in the farthest position opposite said operation direction which is consistent with the partial order, the placement of each event in T being arranged to create a grouping of the displayed events associated with each process;

(vii) updating the contents of set S to remove each event also in set T and to replace each of those removed events in S with the event in the process associated with the removed event which succeeds the removed event in the partial order with respect to the operation direction, and removing all events from set T;

(viii) repeating steps (iv) through (vii) until the display cannot be further updated in the operation direction;

(ix) if the operation direction is opposite said traversal direction, repositioning in the operation direction each displayed event to the position within the grouping of events for its associated process which is closest said first boundary and is consistent with the partial order of the information;

(x) setting said operation direction to the opposite direction;

(xi) replacing the contents of S with: the set of events which immediately succeed, with respect to the direction of operation, the event in each process which is displayed furthest in the direction of operation; non-displayed asynchronous events which are the partner events of events already placed on the display and which succeed their displayed partner events with respect to the direction of operation when the operation direction is the traversal direction; and non-displayed asynchronous events which are the partner events of events already placed on the display and which succeed their displayed partner events with respect to the direction of operation but which do not precede, with respect to the traversal direction, any first event on the previously completed display when the operation direction is opposite the traversal direction; and wherein if two events from the same process are eligible to be placed in S, only the preceding event, with respect to the direction of operation, is placed in S;

(xii) repeating steps (iv) through (xi) until no events, which are associated with at least one process on the display for which no events had yet been displayed, are added to the display;

(xiii) determining the set of processes which are to be displayed and for which no events have yet been displayed;

(xiv) determining the subset of said set of processes whose previously displayed event in the position closest said first boundary cannot be displayed in compliance with said partial order;

(xv) replacing the contents of S with the first events succeeding, with respect to the traversal direction, each of said previously displayed events in said subset of events and which may be displayed according to the partial order;

(xvi) repeating steps (iii) through (xv) until set S is a null set;

(xvii) replacing the contents of S with the previously displayed event in the position closest said first boundary for each process in said set of processes formed in step (xiii);

(xviii) repeating steps (iii) through (viii).

A further aspect of the present invention is to provide a method of constructing a display of partially ordered information comprising a plurality of synchronous and/or asynchronous events, at least some of these events each being related to a different other event to form an event pair and each event being associated with one of a plurality of processes, the information being displayed on a display with opposed first and second boundaries where, in response to the user identifying and locating an event of interest on the display adjacent the first boundary, the first boundary defining a datum point in the partial order and the second boundary defining a traversal direction extending from the datum to the second boundary for traversing the partial order, the method comprises the computer implemented steps of:

(i) creating a set S to represent events to be considered for placement on the display and setting S to comprise the event of interest;

(ii) defining an operation direction equivalent to said traversal direction;

(iii) for each event in S, adding its partner event to S if: said event is a synchronous event or if said partner event is an asynchronous event succeeding said event in the partial order with respect to the operation direction and said partner event does not precede, with respect to the traversal direction, any first event on the previously completed display; and either the process to which the partner event is associated with is currently not in S or the event in said process already in S succeeds the partner event in the partial order with respect to the operation direction;

(iv) determining events in S for which no other event in S precedes them in the partial order with respect to the operation direction and placing said events into a set T;

(v) displaying each event in T on the display in the farthest position opposite said operation direction which is consistent with the partial order, the placement of each event in T being arranged to create a grouping of the displayed events associated with each process;

(vi) updating the contents of set S to remove each event also in set T and to replace each of those removed events in S with the event in the process associated with the removed event which succeeds the removed event in the partial order with respect to the operation direction, and removing all events from set T;

(vii) repeating steps (iii) through (vi) until the display cannot be further updated in the operation direction;

(viii) if the operation direction is opposite said traversal direction, repositioning in the operation direction each displayed event to the position within the grouping of events for its associated process which is closest said first boundary and is consistent with the partial order of the information;

(ix) setting said operation direction to the opposite direction;

(x) replacing the contents of S with: the set of events which immediately succeed, with respect to the direction of operation, the event in each process which is displayed furthest in the direction of operation; non-displayed asynchronous events which are the partner events of events already placed on the display and which succeed their displayed partner events with respect to the direction of operation when the operation direction is the traversal direction; and non-displayed asynchronous events which are the partner events of events already placed on the display and which succeed their displayed partner events with respect to the direction of operation but which do not precede, with respect to the traversal direction, any first event on the previously completed display when the operation direction is opposite the traversal direction; and wherein if two events from the same process are eligible to be placed in S, only the preceding event, with respect to the direction of operation, is placed in S;

(xi) repeating steps (iii) through (x) until no events, which are associated with at least one process on the display for which no events had yet been displayed, are added to the display;

(xii) determining the set of processes which are to be displayed and for which no events have yet been displayed;

(xiii) determining the subset of said set of processes whose previously displayed event in the position closest said first boundary cannot be displayed in compliance with said partial order;

(xiv) replacing the contents of S with the first events succeeding, with respect to the traversal direction, each of said previously displayed events in said subset of events and which may be displayed according to the partial order;

(xv) repeating steps (ii) through (xiv) until set S is a null set;

(xvi) replacing the contents of S with the previously displayed event in the position closest said first boundary for each process in said set of processes formed in step (xii);

(xvii) repeating steps (ii) through (vii).

According to another aspect of the present invention, there is provided a debugger for use with distributed systems comprising:

means for collecting and storing partially ordered event information including an identification of related events and associated processes;

means for constructing a display of events of a first portion of said information in accordance with said partial ordering;

means to select a second portion of said information; and means for reconstructing said display to display events of said second portion in accordance with said partial ordering.

According to another aspect of the present invention, there is provided a display system to present a subset of information related to a plurality of partially ordered events to a user, comprising:

means for storing and recalling said information;

display means for presenting a constructed display to said user, said display means including opposed first and second boundaries;

means for selecting an event from said information;

means for indicating said selected event should be positioned adjacent one of said first and second boundaries;

means for determining which of said plurality of partially ordered events will comprise said subset to be displayed such that the events of said subset include said selected event and related events which may be displayed between said first and second boundaries in accordance with said partial order and in accordance with unidirectional movement, monotonicity, priority, maximal display and minimal change constraints;

means for constructing a display representing said subset.

According to yet another aspect of the present invention, there is provided a method of constructing a display of a subset of information related to a plurality of partially ordered events comprising the steps of:

storing and recalling said information;

selecting an event from said information;

indicating said selected event should be positioned adjacent one of first and second opposed boundaries on a display;

determining which of said plurality of partially ordered events will comprise said subset such that the events of said subset include said selected event and related events which may be displayed between said first and second boundaries in accordance with said partial order and in accordance with unidirectional movement, monotonicity, priority, maximal display and minimal change constraints;

constructing a display representing said subset.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

Figure 1:
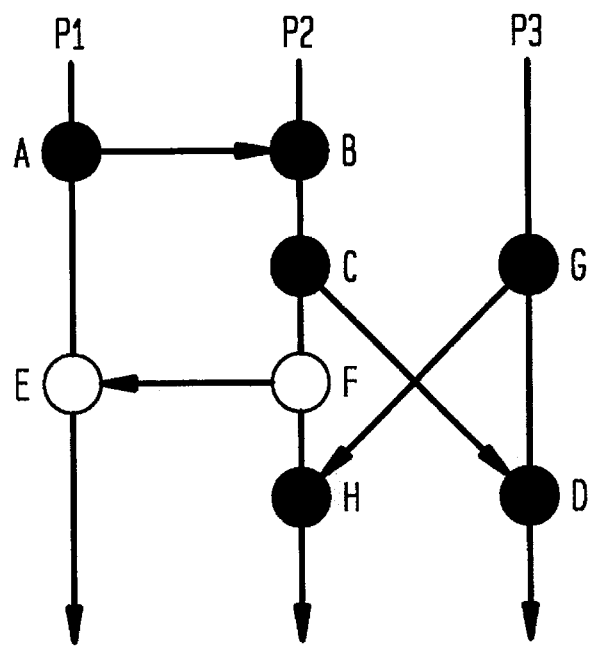
FIG. 1 shows a simple event diagram.

The preferred embodiments of this invention are described hereafter in association with clearly concurrent processing systems, such as distributed and parallel systems. However, the invention is applicable in any system in which the display of partially ordered data would be useful. This would include systems that are not, strictly speaking, concurrent, but that do exhibit concurrent processing characteristics, such as uni-processors simulating concurrency in reactive or interactive systems.

Thus, the invention provides a useful event tracer for any type of environment exhibiting concurrent or apparently concurrent characteristics, including transaction processing for database technology, and object tracing in object oriented programming.

As used herein, the term distributed system is intended to comprise systems providing concurrent execution of processes, both multiprocessor systems and parallel processing systems. Also, as used herein, the term event is intended to comprise inter-process communications in distributed systems and failed attempts at inter-process communication and other unary events such as process start and exit events. A failed inter-process communication occurs when a first process attempts unsuccessfully to pass a message to another process and this results in a unary event (i.e.—an event without a partner event) which may be of particular interest when examining the execution of a program.

Further, as used herein the terms debugger and/or debugging are intended to encompass the acquisition and display of information useful to understand the execution of portions of a program or system. It will be apparent to those of skill in the art that the use of this information is not limited to correcting errors (bugs) in program execution but can also be used to understand the execution of the system or program for other purposes such as benchmarking, optimization of algorithms and resource allocation, etc.

As the method and techniques for acquiring suitable debugging information are well known to those of skill in the art, these methods and techniques will not be discussed in detail herein. In the presently preferred embodiment, the debugging information comprises a singly-linked list of header blocks, each of which is linked in turn to a number of event blocks which each store the relevant information regarding a number of events. Specifically, in the presently preferred embodiment, each header block may be linked to up to nineteen event blocks, and each event block may store the relevant information for up to fifty events. The presently preferred relevant information comprises: the event type; the identity of the process in which the event occurred; an event sequence number indicating the order of the occurrence of the event relative to other events in the same process; the identity of the partner process (if any); the event sequence number of the partner process (if any); a synchronous/asynchronous flag; and a failure flag.

This structure of the debugging information allows relatively fast access to any particular event when given the process and sequence number of the event. In the preferred embodiment, additional information, such as a text label for the event, the type of symbol to be used to display the event, etc. is stored in a table which is indexed by event type. Of course, the present invention is not limited to use with debugging information stored in this particular structure and other suitable structures will be apparent to those of skill in the art.

FIG. 1 shows a simple event diagram showing processes from a program executing on a distributed system. The diagram includes three spaced vertical lines, each of which identifies a process executing as part of the program. The vertical axis of the diagram represents time which, in the configuration shown, is increasing in the downward direction.

Each process line can be labelled with an appropriate label to identify the particular process, such as the P1, P2 and P3 labels shown in the Figure, or any other suitable label as selected by the user. Each process line has one or more event nodes which are indicated by an appropriate symbol, such as a filled or open circle, and which may also be labelled (A through H in the Figure) to assist the user in identifying the events. While a vertical arrangement of the process lines has been shown, it will be appreciated that the present invention is not limited to a vertically orientated display and a horizontal orientation may also be employed. Further, in the likely circumstance that many processes occur within the program, the user may select which processes will be displayed on the display and their ordering on the display.

Of course, the present invention is not limited to the display and organization of events from processes in distributed systems. It will be apparent to those of skill in the art that instead of a process, the present invention can group and display events from monitors, semaphore events, and other similar information which would also be useful in understanding and debugging distributed systems.

In the event diagram, information or message passing which relates two events is indicated by an arrow extending from the originating event to the receiving event. Events which are so related are hereinafter referred to as partner events and/or an event pair. In the Figure, the arrow extending from event A to event B indicates that event A has passed information or a message to event B. A horizontal arrow, such as that from event A to event B, is used to indicate synchronous communication between the two events. If the arrow is non-horizontal, such as the arrow between events C and D, an asynchronous communication is indicated, i.e.—it is known that event C preceded event D.

To further assist in the interpretation of the information in the event diagram, a distinction is made between call events and return events. In the diagram, a call and a receive of a call are indicated with filled circles (events A and B) and returns and receives of returns are indicated with open circles (events E and F). Of course, additional symbols may be employed to distinguish further the information represented in the diagram. For example, I/O events may be represented by open or filled triangles, etc.

As discussed above, in a distributed system it is only possible to obtain a partial order of events and often the display of such a partial order of events can be misleading, or at best non-intuitive. For example, in FIG. 1 it is clear that event A precedes event D as events A and B are a synchronous event pair and event B precedes event C, which in turn precedes event D. However, although the diagram appears to suggest that event G precedes event F, this is not necessarily the case as all that is in fact known is that event G must precede event H which follows event F. It may well be the case that event G occurs after event F but it is impossible to determine this from the partial order. At best, we can say that G is concurrent with F.

In a typical program executing on a distributed system, many hundreds of events may occur. In any practical debugging system, it will be required to provide the user with the ability to display an event diagram which is a subset of these events. It is believed that the most intuitive way of providing such a display, with commonly available hardware, is to provide scrolling of the event diagram to display an event diagram representing a subset of events of interest from the total partial order of events. In this manner, the user of the debugger can scroll the event diagram to identify and review particular subsets of the events of interest. In the vertical configuration shown herein, the scrolling would be vertical (i.e.—preceding events scrolling on or off the top of the display and succeeding events scrolling on or off the bottom of the display). In a horizontal configuration, the scrolling would occur on or off the sides of the display as appropriate.

As the events of the event diagram are only partially ordered, it is possible to scroll the diagram in different ways, which result in different displays. These displays are often, at best, non-intuitive, and at worst counter-intuitive. The present inventor previously attempted a scrolling method employing fixed positioning of events with less than satisfactory results. This previous system is described in the article "A Prototype Debugger For Hermes", D. J. Taylor, Proceedings of the 1992 CAS Conference (Nov. 9–12, 1992), Volume I, pp. 29–42, published by the IBM Center For Advanced Studies, and the contents of this article are incorporated herein by reference.

Figure 2:
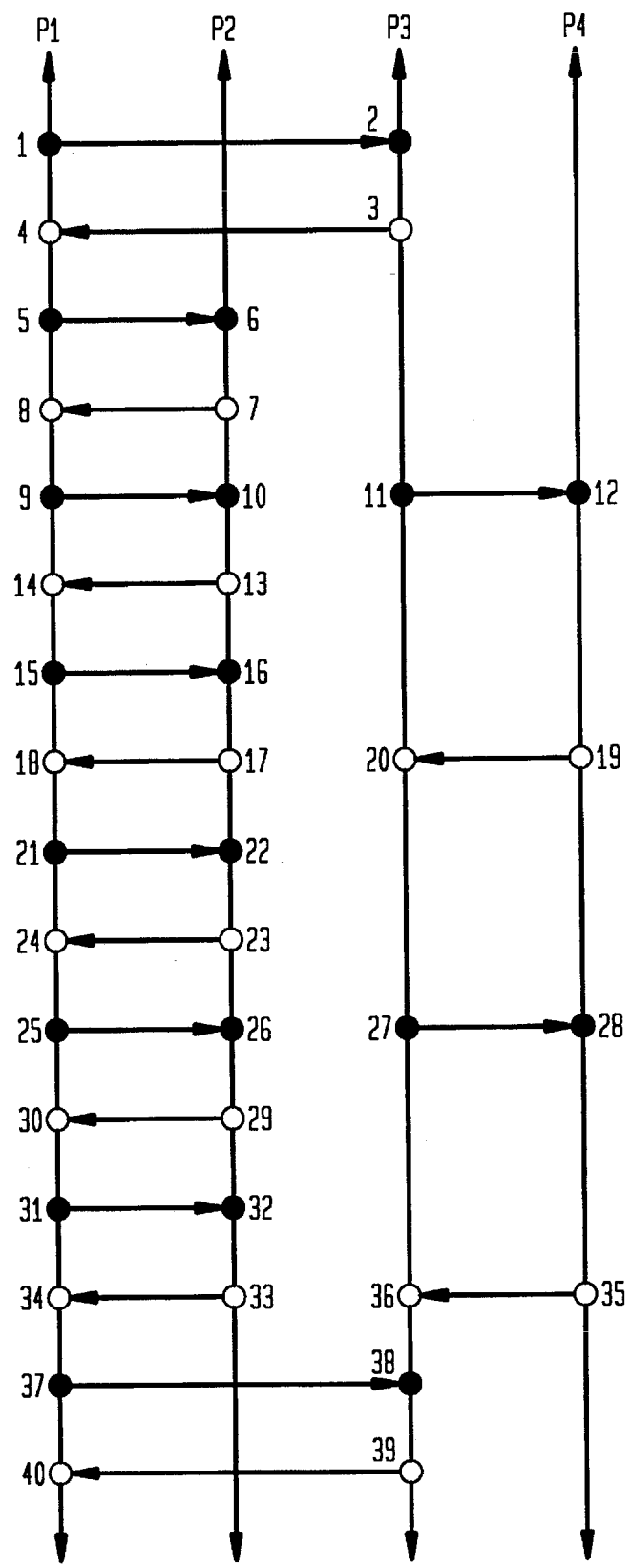
FIG. 2 shows a hypothetical example set of events arranged in a total order.

FIG. 2 shows a hypothetical total order of events wherein the events are shown in their real time of occurrence. While, as discussed above, it is not possible to obtain such a full ordering of events in a distributed system, this Figure is included for the purpose of demonstrating the difficulties experienced with previous methods of scrolling event diagram displays. In the Figure, the events are labelled with consecutive numbers, the numbers increasing in value with the real time of the occurrence of the event.

Figure 3:
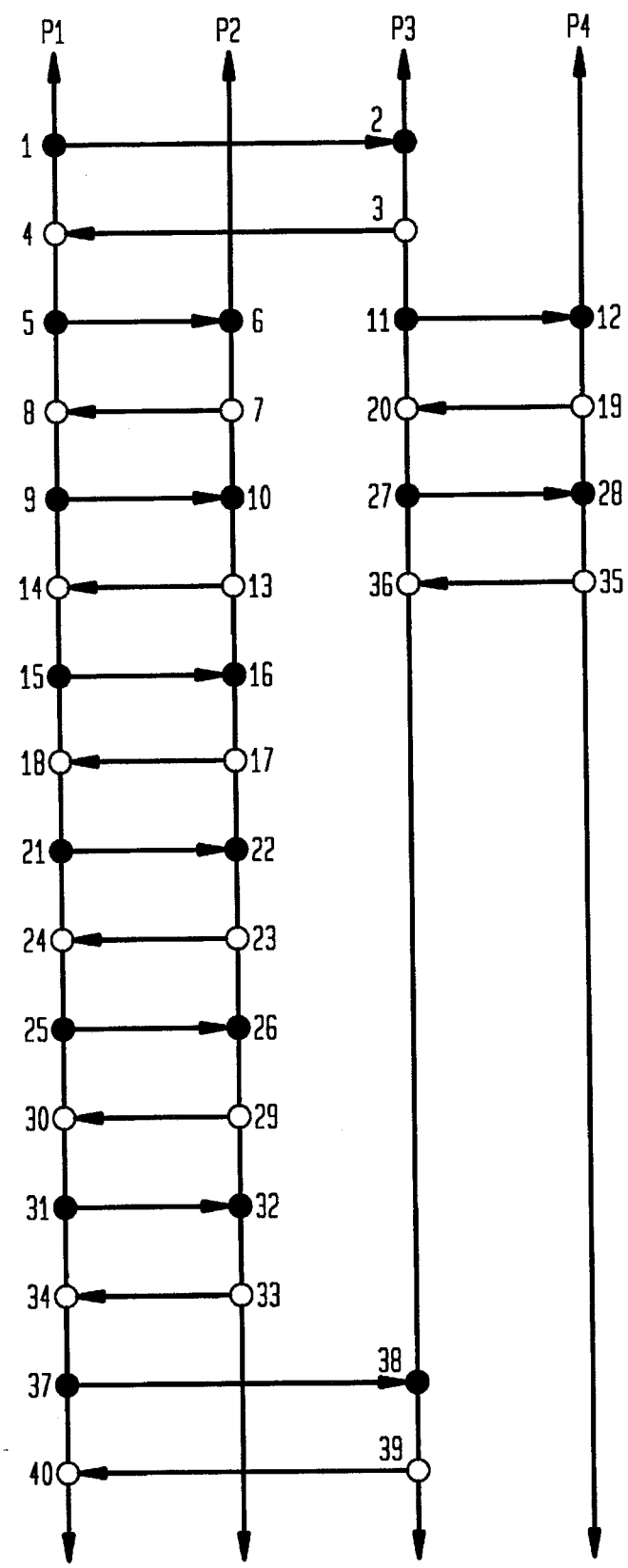
FIG. 3 shows the events of FIG. 2 arranged in one possible partial order.
Figure 4:
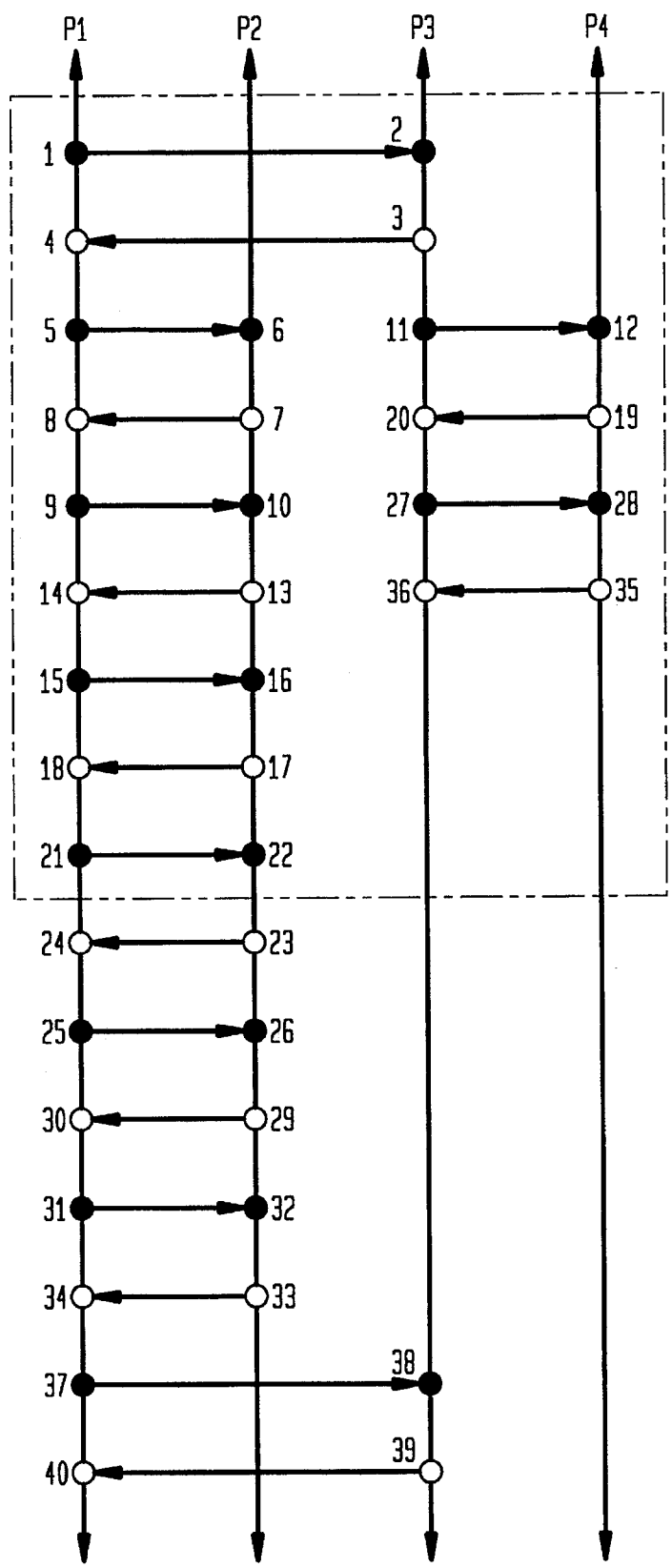
FIG. 4 shows the events of FIG. 3 shown on a fixed order display.
Figure 5:
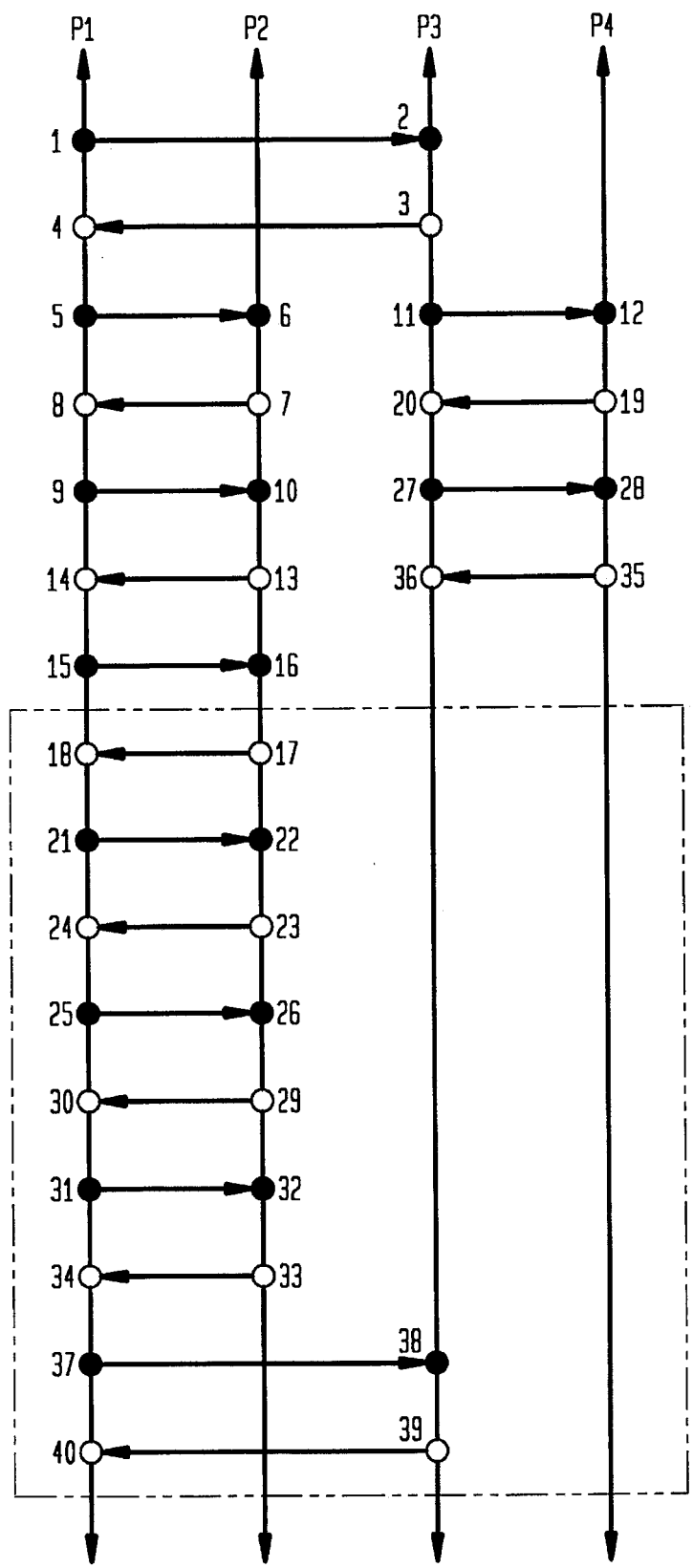
FIG. 5 shows the display of FIG. 4 after it has been scrolled downward.

In the prior art fixed position display, each event is fixed with respect to other events as if it was fully ordered. Such fixing of events leads to misleading event diagram displays. FIG. 3 shows the events of FIG. 2 arranged in one of the possible arrangements consistent with a partial ordering of the events. FIGS. 4 and 5 show the different displays (the area within the dashed box) which would result from scrolling the display using a fixed position display. As can be seen from these Figures, depending upon the initial partial order selected, the scrolled display can create non-intuitive, or even misleading, displays. For example, as shown in FIG. 2, the event pair labelled 19 and 20 (the notation 'event pair 19–20' will be used hereinafter) occurs at the same time as event pair 17–18. However, because of the fixed partial order, when scrolling the display from the position indicated in FIG. 4 to that indicated in FIG. 5, event pair 19–20 is scrolled off the display while event pair 17–18 remains on the display. In fact, in the particular example shown, scrolling the display up to place any one of event pairs 15–16, 13–14, or 9–10 at the top of the display will still result in event pair 19–20 remaining off the display.

Such a display can result in debugging operations being very difficult to complete. For example if an error (bug) occurs at event pair 21–22 which is due to some correlation between event pairs 17–18 and 19–20, it will be extremely difficult to locate and identify this correlation while event pair 19–20 is off the display.

The present inventor has determined that a useful and intuitive debugging display is obtained by allowing the user to scroll the display by selecting and moving (dragging) an event pair of interest to the top or bottom of the display and then reconstructing the display of the remaining events in accordance with a set of six specific constraints. It is believed that this method of constructing the display avoids the complexity and confusion which results from trying to provide an emulated full order (fixed positioning) of partially ordered events.

The six constraints required are:
(1) Vertical Position—if an event X precedes event Y and both appear on the display, then X must be displayed at a higher level than Y;
(2) Unidirectional Movement—if an event is moved up (or down) the display, then everything else on the display must either move up (or down) or stay in the same place;
(3) Monotonicity—if something is moved farther in a case A than in a case B, then everything else on the display should move at least the same distance in case A as in case B;
(4) Priority—when an event is moved, events that are precedence-connected to it should have priority for being placed on the display over events that are not precedence-connected;
(5) Maximal Display—As many events as possible should be displayed consistent with the constraints above; and
(6) Minimal Change—No event should be moved off of the display unless required by one of the constraints above.

A useful analogy for describing the use of these constraints is a display which resembles a system wherein the process lines are wires, the events are beads strung on the wires and the communications between events are links between beads. The events may be slid along the process lines as desired, moving any linked event as well, but an event may not slide past another event on its process line. These constraints have been selected to provide a display which presents the events in a useful and informative manner which is, at the minimum, not counter-intuitive to the user.

The Vertical Positioning constraint merely forces the display to correspond to the partial order of the events. It should be noted that, while this constraint requires that a preceding event be placed above a succeeding event, it does not imply the converse (i.e.—an event which is concurrent with a second event may be placed higher on the display than the second event).

The Unidirectional Movement and Monotonicity constraints are intended to provide a consistent impression that events are dragged up or down the display. If a user drags an event to the top of the display, the other events may be pushed up by the dragged event, or may follow it, but no events would move down the display.

Despite these first three constraints, the construction of an event display is still not fully defined (i.e. it is still possible to construct different displays from a given partial order). The Priority constraint is therefore employed to further define the display in a useful manner which results in a display which contains more useful information than may otherwise be the case for other possible displays.

Figure 6:
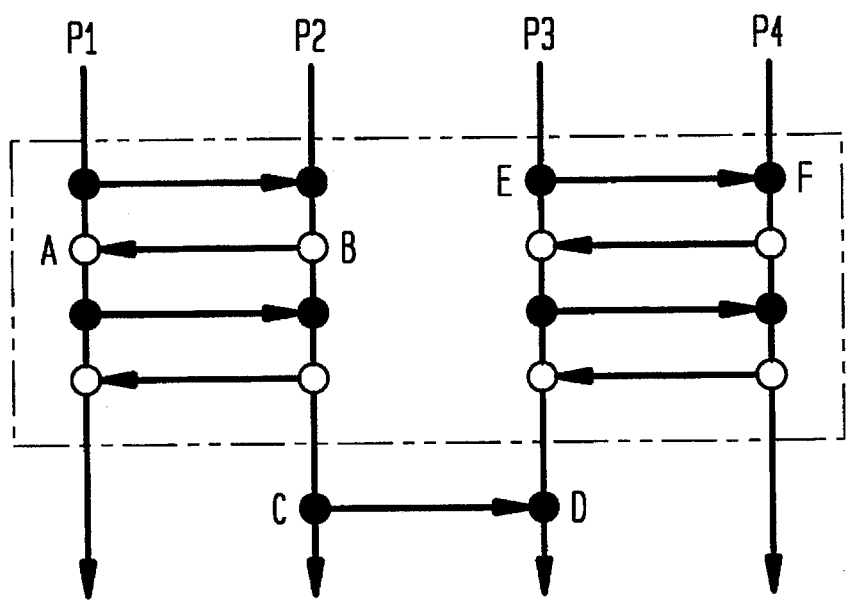
FIG. 6 shows an example of the effect of a precedence constraint in accordance with the present invention.

FIG. 6 shows a portion of a display wherein the effect of the Priority constraint may be seen. In the example, the borders of the display are indicated by the dotted box. Without the Priority constraint, if the user moves event pair A–B to the top of the display, either event pair E–F could remain on the display or event pair C–D could be moved onto the display requiring event pair E–F to be moved off the top of the display. Under the Priority constraint, the latter action occurs as events A and C are precedence-connected (through event B) and events A and E are not.

The Maximal Display constraint is employed to prevent, where possible, the undesired case wherein a blank space results on a large portion of the display after a scrolling operation. As implemented, the Maximal Display constraint is subordinated to the preceding four constraints and thus such blank spaces may still occur due to the preceding constraints, especially the Priority Constraint.

Finally, the Minimal Change constraint is employed to prevent unnecessary changes in the display subject to the preceding five constraints. An example of the use of this constraint would be if the display in FIG. 6 was one row less in height (displaying only the top three lines of events). Under the Minimal Change constraint, the displayed events of processes P3 and P4 would not be changed if event pair A–B is moved to the top of the display.

The present invention provides the construction of an event diagram, in accordance with the above-described six constraints, using a multiple sweep method to construct the display. In the following discussion, it is assumed that the user has moved (dragged) an event of interest to the top of the display and that the remaining events to be displayed are to be determined and placed beside or below the event of interest in accordance with the multiple sweep method described below. It will be apparent to those of skill in the art however, that if the event of interest is placed at the bottom of the display, the multiple sweep method is merely implemented in reverse to construct the display by placing the remaining events beside or above the event of interest. It will also be apparent to those of skill in the art that while the terms 'up' and 'down' are used herein to refer to directions relative to the display, it is intended that 'up' refers generally to preceding events in the partial order and 'down' refers generally to succeeding events in the partial order. Thus, in a debugging display with a horizontally arranged display with time increasing from left to right, the term 'up' would refer to preceding events (i.e.—to the left) and the term 'down' would refer to succeeding events (i.e.—to the right).

The method of constructing the display is initiated with an event of interest being identified and placed at the top of the display. This initiates a series of alternating "sweep-down" and "sweep-up" operations as described below. In the case of a first display being constructed for a set of events, one of the first events in the partial order is selected by the debugger or user as the event of interest. In the more common case, the event of interest is selected by the user from those already displayed on the display and is moved to the top of the display to initiate the scrolling operation. The selection of the event of interest, and its repositioning, may be accomplished by the user with a mouse, trackball or any other suitable input device, including input received from another program or a database, as would be apparent to those of skill in the art.

When the event of interest is selected and placed at the top of the display, a first sweep down operation is initiated. The selected event of interest is made an element (at this point, the sole element) of a set of events S upon which the sweep operation acts. The operation examines each event in set S and adds the partner event for the events of set S if: either the event is synchronous or the event is an asynchronous send; and either the process (P) to which the partner event belongs is not currently represented in S or the event in that process (P) already in S is a successor of the partner event. In the latter case, the partner event will replace the event which was already in S for that process.

When all of the elements of S have been determined, S is examined to identify the events therein with no predecessor events in S and these events are made elements of a set T. An element is defined as a predecessor of a second element if it is located in the partial order prior to the second element. For example, in the partial order of FIG. 1, event A is a predecessor of event D.

In the present invention, the method of determining whether an event is a predecessor (or successor) of another event is through the use of a vector timestamp which is calculated as required. The vector timestamping of partially ordered events is known to those of skill in the art from several publications including, "Partial Ordering of Synchronizing Events for Distributed Debugging in Tightly-coupled Multiprocessor Systems", van Dijk and van der Wal, Distributed Memory Computing, Proceedings of the 2nd European Conference, EDMCC2, Munich Apr. 22–24, 1991 or "Timestamps in Message-passing Systems that Preserve the Partial Ordering", Colin J. Fidge, Proceedings of the 11th Australian Computer Science Conference, pp. 56–66, Brisbane, 1988. Of course, any other suitable method of determining precedence may be employed, include graph traversal, etc., as would occur to one of skill in the art.

The events in T are placed on the display, in as high a position as possible which is consistent with the above-mentioned vertical positioning constraint. After they are placed on the display, S is updated by removing all of the events which are in T and replacing them with the next event in their respective processes P. After S is updated, T is set to a null set. S now comprises the successor events of the events previously in T, as well as the previous events of S which were not elements of T.

The sweep down operation then proceeds to again: add the appropriate partner events (as described above) for the updated set S; check the events in S to identify those events with no predecessor events in S and make those events elements of T; place the events of T on the display in as high a position as possible which is consistent with the vertical positioning constraint; update S by removing the elements of T therein and replacing them with the next event in their respective processes P; and setting T to a null set. These steps are repeated until the bottom of the display is reached.

Each successive sweep (described below), either up or down, is a variation on the above-described operation wherein the elements in set S at the start of the sweep are determined as discussed below and (for the sweep up) the necessary parameters in the operation are reversed (described more fully below). Further, it will be apparent to those of skill in the art that, in the situation wherein the selected event of interest is placed at the bottom of the display, the same above-described sweep operation is employed with the reversal of the necessary parameters to provide a first sweep up operation.

To reverse the sweep down operation to achieve a sweep up operation, the following parameters are changed: events are displayed as low as possible on the display; events removed from S are replaced with their predecessor events; and the conditions for adding partner events for new events in S are: either the event is synchronous or the event is an asynchronous receive whose partner event does not precede any event at the top the previously completed display; and either the process P to which the partner event belongs is not currently represented in S or the event in that process P already in S is a predecessor of the partner event.

The above-mentioned additional restriction wherein partner events of asynchronous receives are checked to ensure that they do not precede an event at the top of a previously completed display, is only required when the sweep operation is in the direction opposite that of the first sweep operation. Specifically, this constraint is required during subsequent sweep up operations when the event of interest was placed at the top of the display or during subsequent sweep down operations when the event of interest was placed at the bottom of the display. The effect of this additional restriction is discussed further below, with reference to FIG. 7.

A representation of the steps of the first (and subsequent) sweep down operations is:

For each event s which is a member of S
If s has a synchronous partner event or an asynchronous receive partner event t which is not a member of S
P=the process containing t
If an event from P is in S and t precedes that event replace that event in S with t
Else if no event from P is in S, add t to S
While the bottom of the display is not reached
T={t is a member of S, such that t has no predecessor in S}
place all events in T as high as possible in the display
For each t which is a member of T
delete t from S
add t's successor (in the same process) to S
If t is a synchronous communication event or an asynchronous send
u=t's partner event
P=the process containing u
If an event from P is in S and u precedes that event replace that event in S with u
Else if no event from P is in S, add u to S The subsequent sweep operations, after the first sweep, commence with S comprising the set of events immediately preceding (for a sweep up) or immediately succeeding (for a sweep down) the event in each process which is displayed most distal in the direction of the sweep. For a sweep up, S would contain each of the events immediately preceding the event in each process which is displayed highest on the display and for a sweep down, S would contain each of the events immediately succeeding the event in each process which is displayed lowest on the display. In addition, for sweep operations in the same direction as the first sweep operation, each non-displayed asynchronous event which is the partner of an event already placed on the display and which is succeeding the displayed event, with respect to the direction of the sweep, would also be added to S.

Figure 7:
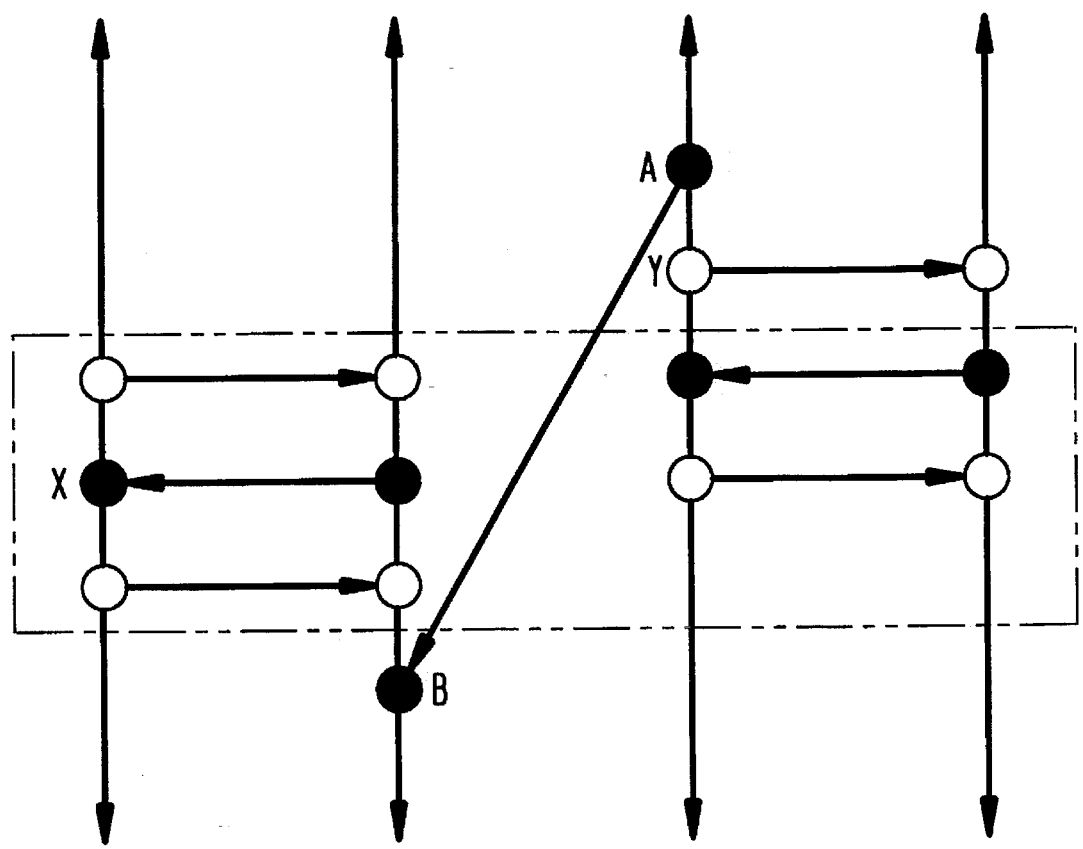
FIG. 7 shows an example of the effect of the handling of asynchronous events.

For sweep operations in the direction opposite to that of the first sweep operation, each non-displayed asynchronous event which is the partner of an event already placed on the display and which is succeeding the displayed event, with respect to the direction of the sweep, would be added to S provided that there was no event on the top line of the previous complete display which was a predecessor event, with resist to the direction of the sweep operation, to the partner event. FIG. 7 shows an example wherein the latter restriction is required. If the event labelled X is moved to the top of the display, indicated by the dotted rectangle, then without the above-described restriction, the event labelled A would be pulled onto the display in the subsequent sweep down, thus violating the Unidirectional Movement constraint. With this restriction applied, event A will not be placed in S as the event labelled Y was a successor event to A and was displayed on the top line of the last complete display constructed.

Finally, in the case where two events from the same process would be added to S, only the latter event, with reference to the direction of the sweep, is added.

After each sweep operation which occurs in the direction opposite the direction from which the display is being constructed (i.e.—if the event of interest is placed at the top of the display, the display is constructed downwards and the opposite direction would be up), the display elements are compressed by 'shaking' the display. This compression occurs to reposition the displayed events at the farthest position on the display, relative to the direction opposite the direction in which the display is being constructed, which is consistent with the vertical positioning constraint. Essentially, the compression operation is intended to keep all events as closely positioned to the active edge of the display (i.e.—the top edge for a scroll down and the bottom edge for a scroll up) as possible to allow the sweep operations to comply with the Maximal Display constraint.

The compression of the display is accomplished, in the case of a compress up operation (i.e.—after a sweep up operation), by starting at the second line of the display and checking each synchronous event pair to determine if: (a) there is room above the event in each process of the event pair to allow the event pair to be moved up and (b) if the vertical positioning constraint would still be met if the event pair were moved up. If conditions (a) and (b) are met, the event pair will be moved up one line and, if they are not now located on the top line of the display, the same two conditions are rechecked to see if the event pair may be moved up another line of the display. As an asynchronous event (or a unary event) may be moved up or down the display without requiring the movement of its partner event, the compression of each asynchronous event and each unary event is performed in a similar manner to the synchronous event pairs. An example of the compression operation will shown later in this discussion with reference to FIGS. 10 & 11.

As a sweep down operation places events on the display, it is usually the case that one or more events (partner events) will be included from additional processes for which no events have yet been placed on the display and, for some of these processes, it may be possible to add events preceding those placed on the display during the sweep down operation. Further, any asynchronous receive events added during the sweep down need to have their corresponding sends considered for display, if they are not otherwise already displayed. Accordingly, after the sweep down, a sweep up is performed to add these events and their partner events, if appropriate.

Of course, during the sweep up, the addition of these events again may result in one or more events (partner events) being included from additional processes for which no events have yet been placed on the display and, for some of these processes, it may be possible to add succeeding events to those placed on the display during the sweep up operation. Also, any asynchronous send events added during the sweep up need to have their corresponding receives considered for display, if they are not otherwise already displayed. Accordingly, after the sweep up, if any events have been added from such processes, a sweep down is performed to add these events and their partner events, if appropriate. Alternating sets of sweep down and sweep up (or sweep up and sweep down) operations are performed until no further events are added to the display from processes previously not considered.

When the alternating sweep down and sweep up operations are completed (i.e.—no events were added to the display from processes previously not considered during the sweep operations) there may still be one or more processes shown on the display for which no events have yet been displayed. Accordingly, at this point each of these unconsidered processes is examined to determine whether the event in that process which was displayed at the top of the old display, (i.e.—the display before the first sweep operation was started or, in the case of a first display being created for a set of events, the first event in each process) meets the first three constraints and may therefore be included in the new display.

The processes (if any) for which the previous top event does not meet the first three constraints are identified and the next event which does meet the first three constraints for each of those processes is determined and these events are made elements of a new set S which is used to initiate a new series of alternating sweep operations which again continue until no further events are added to the display from processes previously not considered.

When the alternating sweep down and sweep up operations are completed, there may still be one or more processes shown on the display for which no events have yet been displayed. Accordingly, the process described in the two paragraphs above is repeated for the remaining unconsidered processes (if any) until no previously unconsidered processes whose previous top event may not be placed on the display remain.

Finally, the previous top event of all the remaining processes (if any) are placed in a new set S which is used to start a final, single, sweep down.

A simplified representation of the steps in the multiple sweep and the appropriate compression operations for an event placed at the top of the display is:
user selects and places event s at the top of the display;
perform Sweep_Down_And_Up (with S={s});
While (new processes continue to be found) reset S=null;
    For each process P not yet included in a sweep if the top event of P in the previous complete display precedes an event in the top line of the display under construction, add the first event in P that does not precede any event in the top line of the display under construction to S;
    If S not=null, perform Sweep_Down_And_Up; set S=null;
For each process P not yet included in a sweep add the top event of E in the previous complete display to S compress events to top of display if S not=null, perform a final sweep down from S where Sweep_Down_And_Up is defined as:
While (new processes continue to be found)
    compress the displayed events to the top of the display;
    perform a sweep down operation displaying events until the bottom of the display is reached;

reset S to be the set of events which are the immediate predecessor event of the top displayed event for each process;
reset Q to null;
For each asynchronous receive r on the display whose partner event is not on the display and which partner is not a predecessor event to any event which was on the top line of the previously constructed display
q=partner event of r;
If q's process is not represented in Q, add q to Q;
Else if Q contains a predecessor event from q's process, replace that predecessor event in Q with q;
For each event q in Q
If q's process is not represented in S, add q to S;
perform a sweep up operation until the top of the display is reached;
reset S to be the set of events which are the immediate successor event of
the bottom displayed event for each process;
reset Q=null;
For each asynchronous send event r on the display whose partner event is not on the display
q=partner of r;
If q's process is not represented in Q, add q to Q;
Else if Q contains a successor event from q's process, replace that successor event in Q with q;
For each event q in Q
If q's process is not represented in S, add q to S;

Of course, if the event of interest was placed at the bottom of the display, the initial sweep would be a sweep up and the above-mentioned operations would proceed with the reversal of the necessary parameters.

It will be apparent to those of skill in the art that, while the above-mentioned discussion may imply that the new display is constructed while the user observes it, this is not a requirement. In the preferred embodiment, the construction of a new display is completed to a virtual display while the old display is maintained before the user. Once the construction of the new display is completed, the old display is erased and replaced with the new display.

Figure 8:
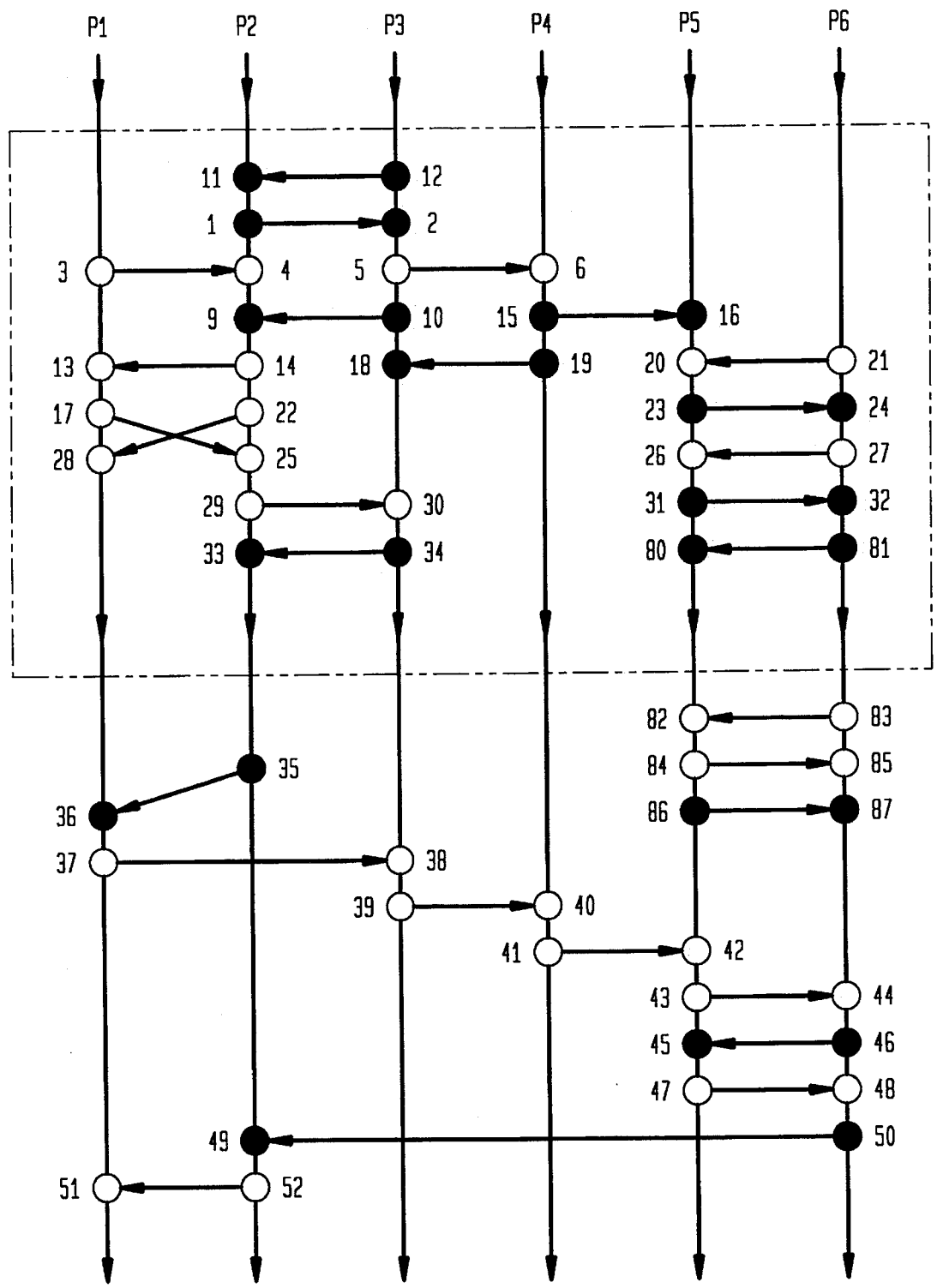
FIG. 8 shows a display constructed in accordance with the present invention and the succeeding events in the partial order.

An example of the construction of a new display will now be described with reference to FIG. 8 which shows an example of a display (the area within the dotted rectangle) of an event diagram created in accordance with the present invention, as well as some of the succeeding events in the partial order (the events below the dotted rectangle). As can be seen, in the Figure each event has been labelled with a unique number. It will be understood however, that any suitable label could be employed by the user.

In this example, the user of the debugger will select event 13 and move it to the top of the display. The first sweep down operation would proceed as follows:

(i) S would initially comprise element 13, the user-selected event;
(ii) the partner event (event 14) of event 13 is added to S;
(iii) T is determined to comprise events 13 & 14 and these events are placed on the top line of the display, S is updated to remove the events in T and replace them with their successor events in their respective processes and to include partner events (if above-described criteria are met) and T is set to a null set;
(iv) S now comprises events 17 and 22 (partner events 25 and 28 are not added as they are asynchronous receive events with predecessor events in P1 and P2);
(v) T is determined to be 17 & 22 and these events are displayed on the second line of the display, S is updated to remove the events in T and replace them with their successor events in their respective processes and to include appropriate partner events, S now comprises events 25 and 28, and T is set to a null set;
(vi) T is determined to comprise events 25 and 28 and these events are displayed on the third line of the display, S is updated to remove the events in T and replace them with their successor events in their respective processes and appropriate partner events are added and S now comprises events 29, 30 and 36 (event 35 is not added as event 29 precedes it);
(vii) T is determined to comprise events 29 and 30 and these are displayed on the fourth line of the display and S is updated, and now comprises events 33, 34 and 36, and T is set to a null set;
(viii) T is determined to comprise events 33 and 34 and these events are placed on the fifth line of the display and S is updated, and now comprises events 35, 36 and 38, and T is set to a null set;
(ix) T is determined to comprise event 35 (as event 36 is preceded by event 35) and this event is placed on the sixth line of the display and S is updated, and now comprises events 36, 38, 49 and 50 and T is set to a null set;
(x) T is determined to comprise event 36 which is placed on the seventh line and S is updated and comprises events 37, 38, 49 and 50, and T is set to a null set;
(xi) T is determined to comprise events 37 and 38 and these are placed on the eighth line of the display and S is updated, and now comprises events 39, 40, 49, 50 and 51, and T is set to a null set;
(xii) T is determined to comprise events 39 and 40 and these events are displayed on the ninth (bottom) line of the display and the sweep stops.

Figure 9:
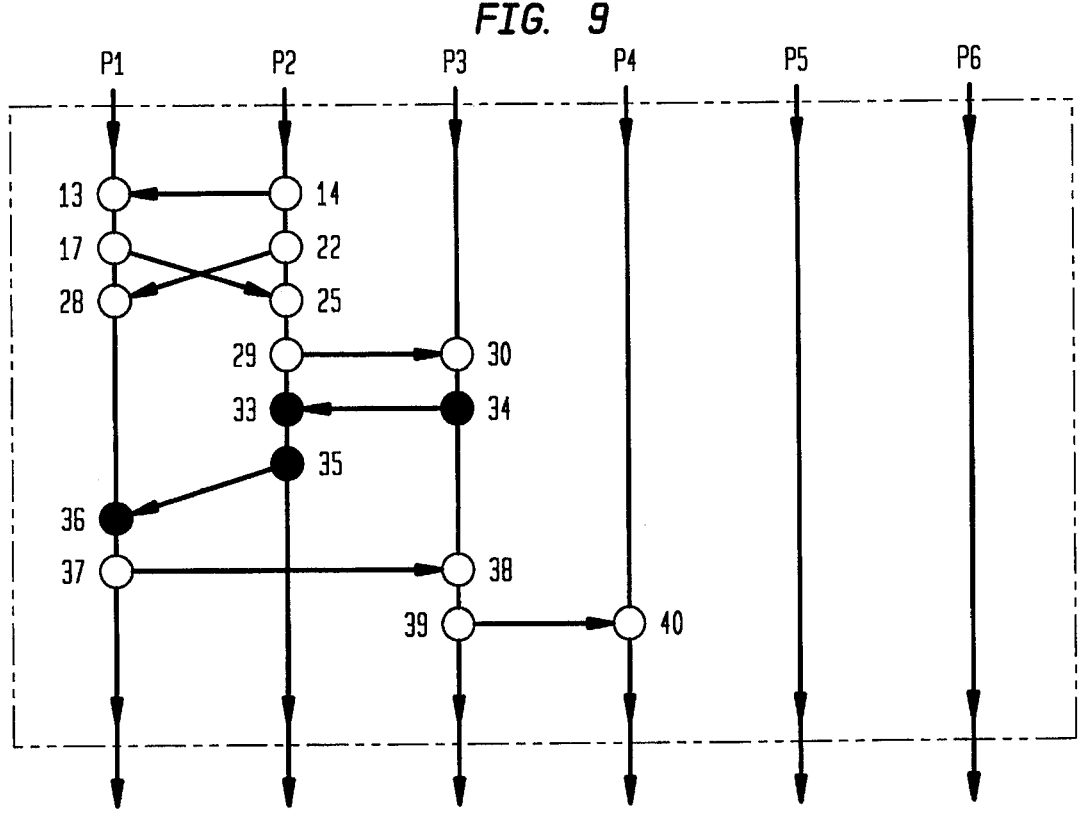
FIG. 9 shows the result after one stage of constructing a new display after the display of FIG. 8 is scrolled upward.
Figure 10:
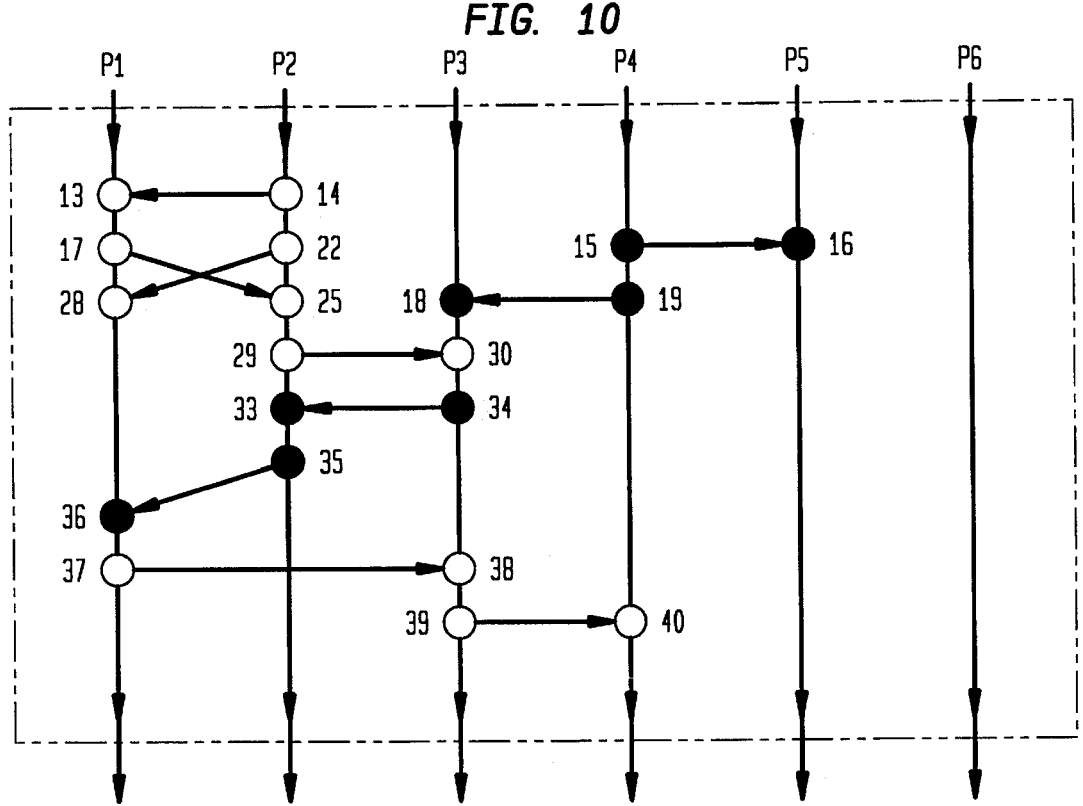
FIG. 10 shows the result after another stage of constructing the display of FIG. 9.

At this point, the extent of the constructed display is as shown in FIG. 9 and a sweep up operation, would now start with S comprising events 3, 9, 18 and 19, (i.e. those events in each process which precede the highest event displayed for those processes). In fact, as processes P1 and P2 (which contain events 3 and 9) have elements on the top line of the display, events 3 and 9 may be removed from consideration by omitting them from S for efficiency, although this is not required. So, assuming events 3 and 9 have not been omitted, after it is updated to include partner events, S comprises events 3, 9, 18 and 19. T is determined to be events 18 and 19 (events 3 and 9 are not included in T as they are predecessors to event 18) and these events are displayed on the line of the display immediately above their highest successor event (event 30). S is updated and now comprises events 3, 9, 10, 15 and 16 and T is determined to be events 9, 10, 15 and 16 and events 15 and 16 are placed on the display. Events 9 and 10 are not placed on the display as there is no line to place them on. As they were not placed on the display, events 9 & 10 remain in S which is updated again, as described, and T is determined to be events 9 and 10 which cannot validly be displayed so, as no events have been placed on the display, the sweep stops. The display resulting from this sweep operation would be as shown in FIG. 10.

Figure 11:
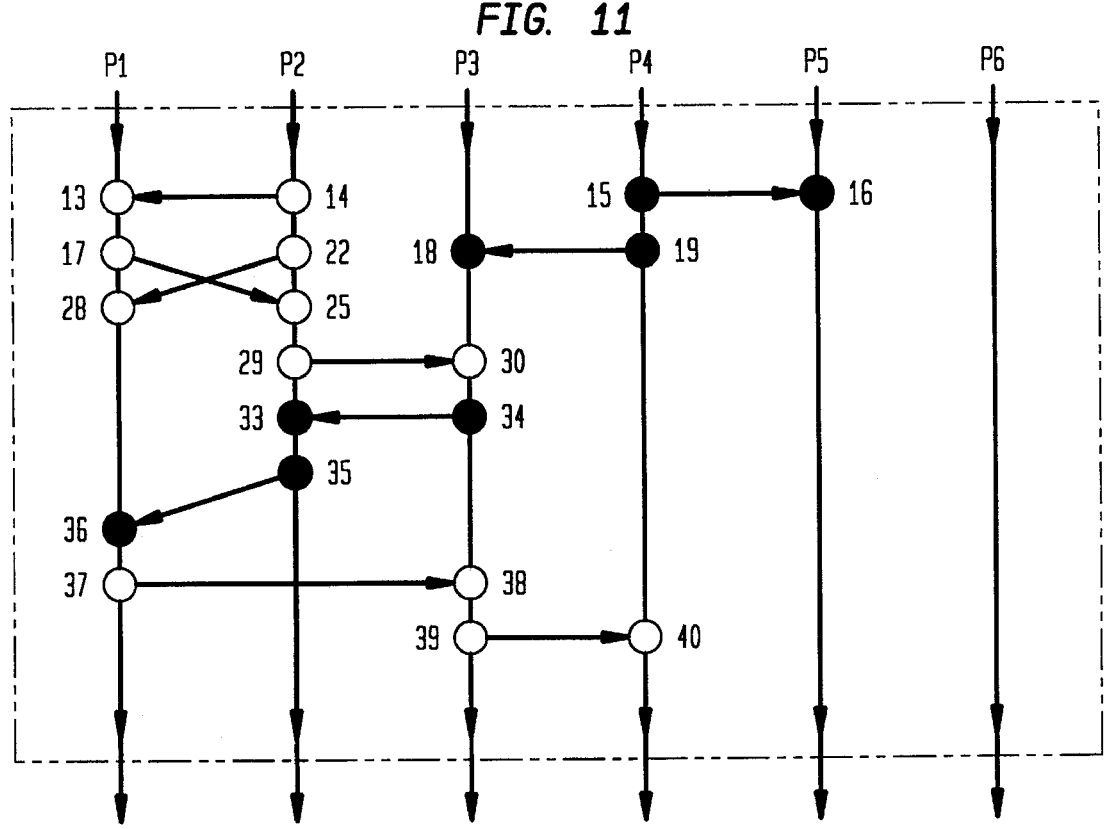
FIG. 11 shows the display of FIG. 10 after it has been compressed upward.

As described above, a compress up operation is performed prior to the next sweep down and this results in the display shown in FIG. 11. As is clear, event pairs 18,19 and 15,16 have been moved up the display.

Figure 12:
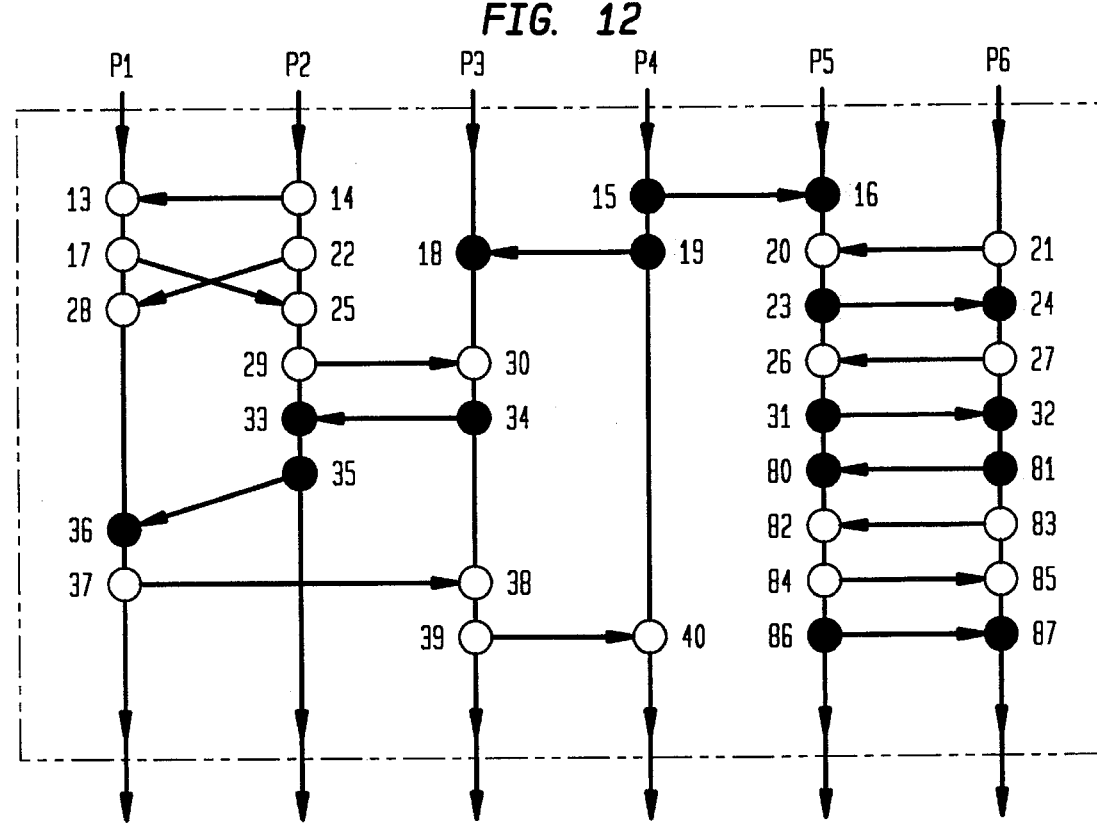
FIG. 12 shows the final resulting display which is constructed after the display of FIG. 8 has been scrolled upward.

The sweep down operation is again commenced with S comprising the event in each process which succeeds the lowest event displayed for those processes. In this example, S would comprise events 20, 41, 49 and 51. Since process P4 has an event displayed in the bottom line of the display, event 41 may be excluded from consideration by removing it from S for efficiency considerations. Assuming event 41 was not removed, after the addition of partner events, s would comprise events 20, 21, 41, 49 and 51 and the sweep down would be performed as described above to result in the display shown in FIG. 12. A sweep up would be performed to add any preceding events to processes introduced during the last sweep down (in the example of FIG. 12 this would not result in any change of the display).

The benefit of performing compress operations on the display, and especially of performing the compress operation after each sweep operation is clearly shown in this example. If the compress operation had not been performed (as shown in FIG. 11), event pair 86–87 would not have been displayed on the display.

At this point, as no events were added from previously unconsidered processes, a check is performed to ensure that all displayed processes have been considered. In the simple example shown in FIGS. 9 through 12, all displayed processes have been considered so no final action is required.

For more complex displays, it is likely that one or more unconsidered processes will remain and a determination would be made to identify the processes whose previously displayed top event can no longer be displayed. The top event which can be displayed for each of these processes would be placed into a new set S and a set of alternating sweep down and sweep up operations would be initiated. When this set of alternating operations is complete, a determination would be made to identify the remaining processes whose previously displayed top event can now no longer be displayed. Again, the top event which can be displayed for each of these processes would be placed into a new set S and another set of alternating sweep down and sweep up operations would be initiated. These steps repeat until either no unconsidered processes remain, at which point the construction of the display is complete, or until all the remaining unconsidered processes have previously displayed top events which may still validly be displayed at the top of the display, in which case each of these top events is placed into a new set S and a final sweep down operation is performed to complete the construction of the display.

While the example above has shown the various stages of the display being constructed for illustrative purposes, it will be understood by those of skill in the art that, as described above, in the preferred embodiment the display would not be shown to the user until its construction is completed. Thus, the user would move event 13 to the top of the display of FIG. 8 and would next be presented with the completed display of FIG. 12.

For clarity, this example has also indicated that the arrows linking events would be drawn after each sweep operation. In the preferred embodiment, for efficiency reasons these arrows are only drawn as the last step to complete the construction of the display. Suitable methods for drawing the arrows on the display are not particularly limited and will be apparent to those of skill in the art. Of course, it will be apparent to those of skill in the art that events of event pairs need not be indicated by arrows and that any suitable indication may be employed, such as color coding, labelling, etc. as would occur to those of skill in the art.

In the preferred embodiment the selection and movement of the event of interest is accomplished by the user through a pointing device, such as a trackball or mouse, an input generated by another program or from any other suitable input as would be apparent to one of skill in the art and the selection and placement of the processes on the display can be similarly accomplished with any suitable input means.

It is contemplated that the user may also select a particular event on the completed display with any suitable input means and additional information relating to the event, such as the contents of the message data, etc. may be displayed as a further aid to debugging and/or understanding the processes within the program.

In many practical distributed systems, a very large number of processes will be present and in most circumstances it will not be physically possible to place all of the processes on a display. Even if it is possible to display all of the processes, the amount of data presented to the user will likely be too great for easy comprehension. To overcome these difficulties, the present invention also provides for the selective grouping of related processes into 'clusters' to reduce, in a useful manner, the information presented to the user of the debugger.

Figure 13:
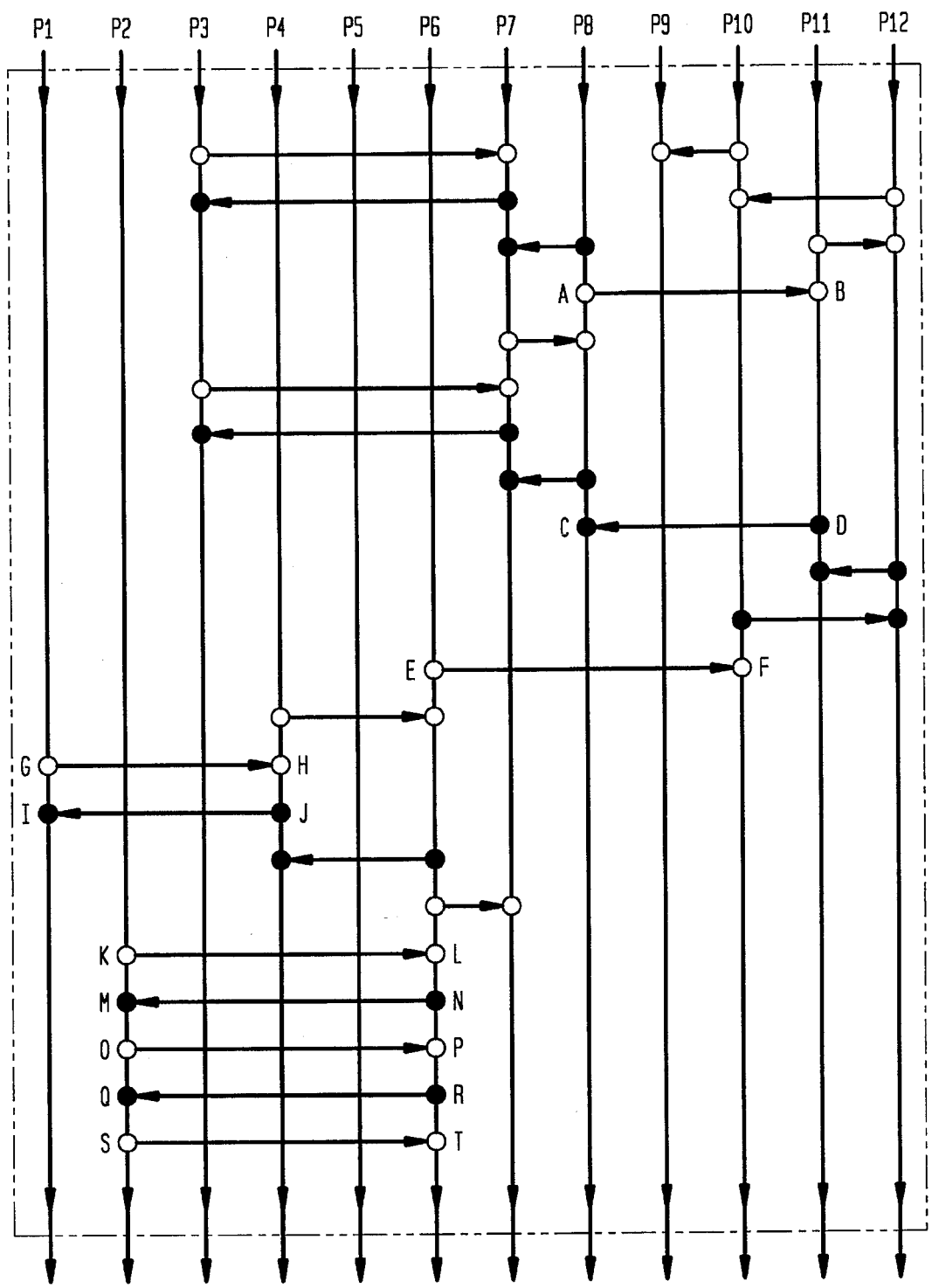
FIG. 13 shows another display constructed in accordance with the present invention.
Figure 14:
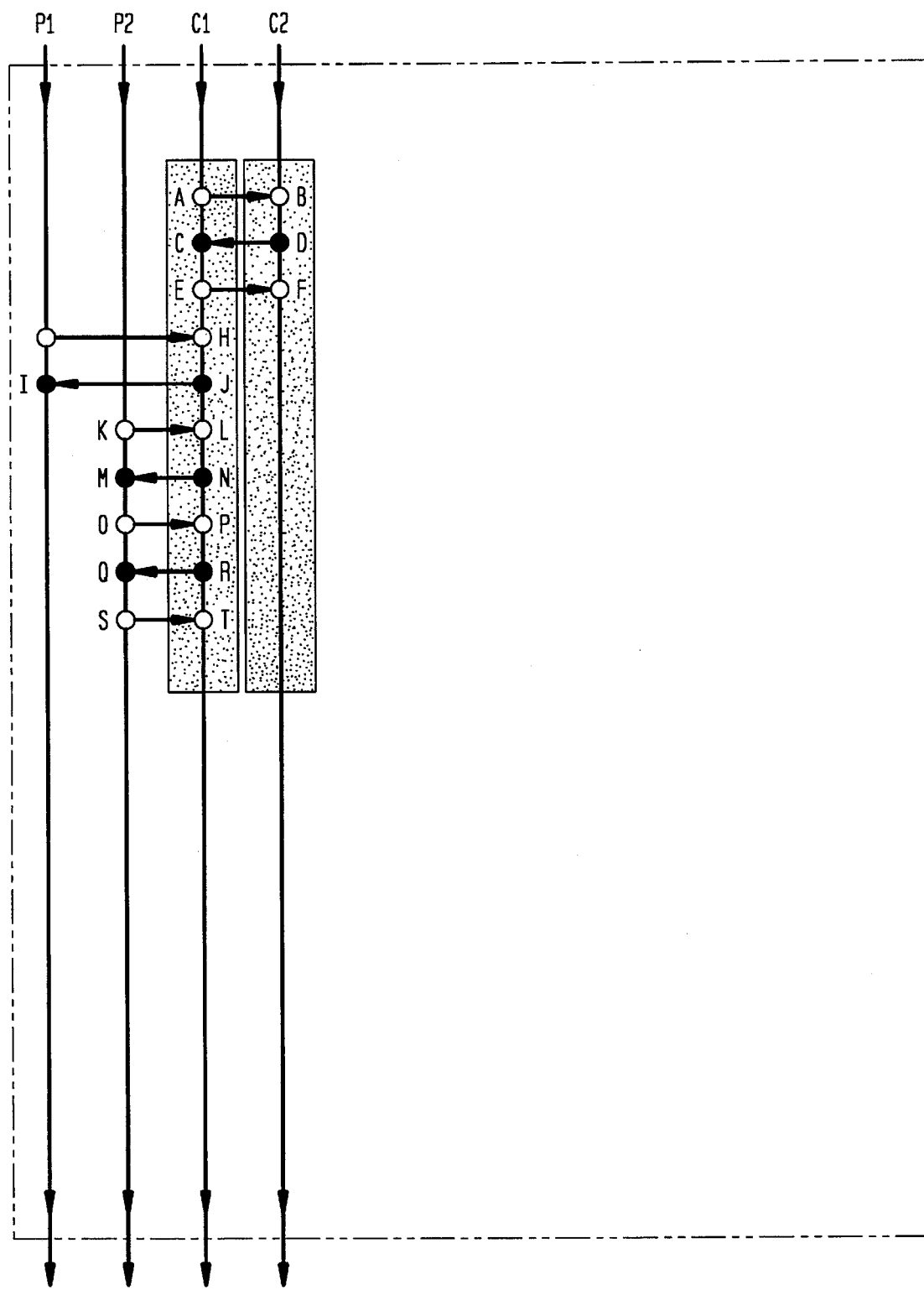
FIG. 14 shows the display of FIG. 13 wherein several processes have been combined into one of two clusters.

Essentially, a cluster is a group of processes whose internal operation has either already been debugged, or whose operations are presently not of interest but whose interaction with the remaining processes is of interest. FIG. 13 shows an example display constructed in accordance with the present invention. In FIG. 14, processes P3 through P8 of FIG. 13 have been grouped into the cluster labelled C1 and processes P9 through P12 have been grouped into the cluster labelled C2. As can be seen in the Figures, the display in FIG. 14 which employs clustering is much simplified in comparison to the display in FIG. 13.

As shown in FIG. 14, the only events which are displayed when clusters are used are those which occur: in or between two displayed processes; in or between a displayed process and a process in a cluster (e.g. event pair G–H); and between two process, each of which is grouped in a different cluster (e.g. event pair A–B). In the example of FIGS. 13 and 14, the number of displayed event pairs is reduced from twenty-five in FIG. 13 to ten in FIG. 14.

Figure 15:
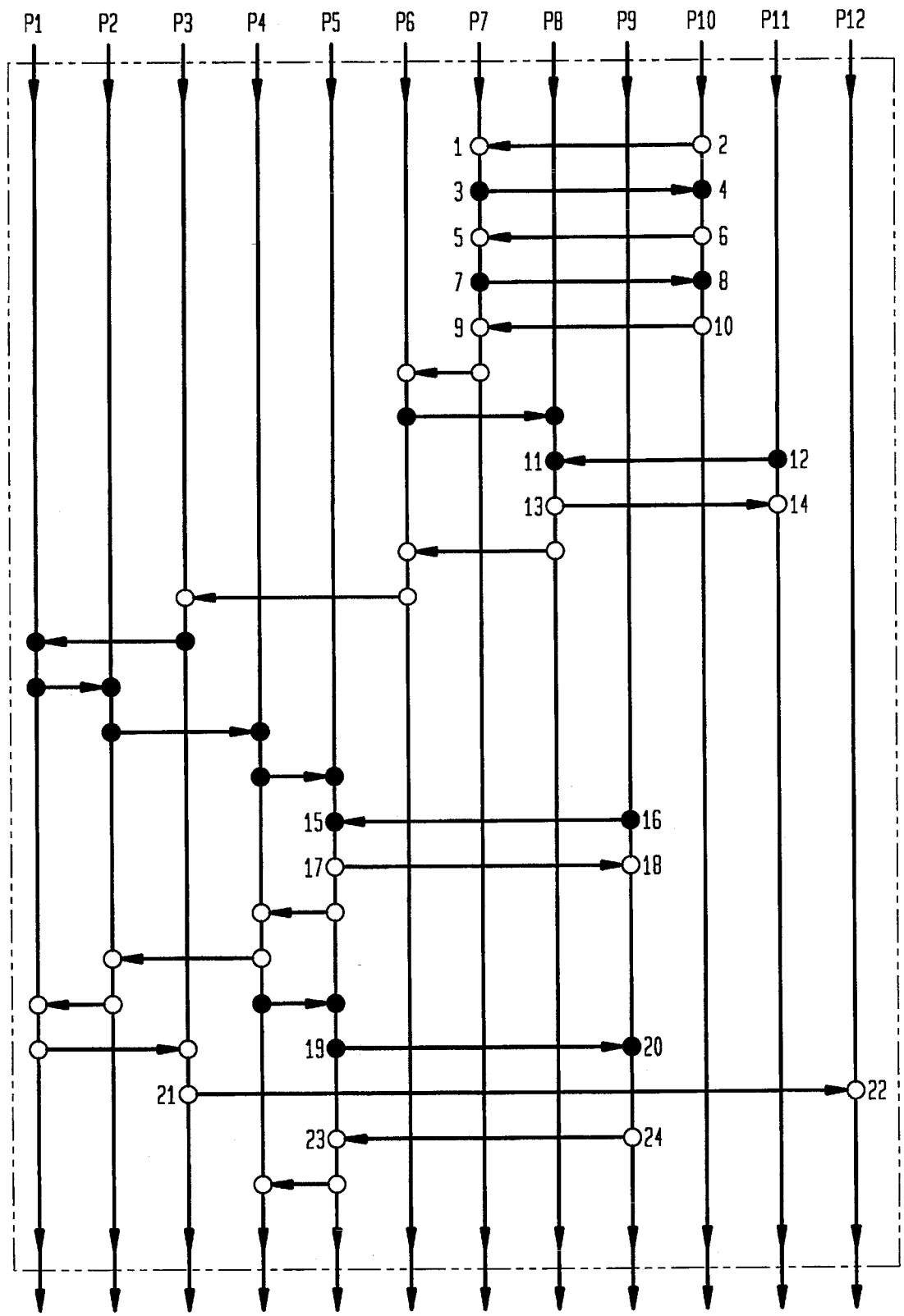
FIG. 15 shows another display constructed in accordance with the present invention.
Figure 16:
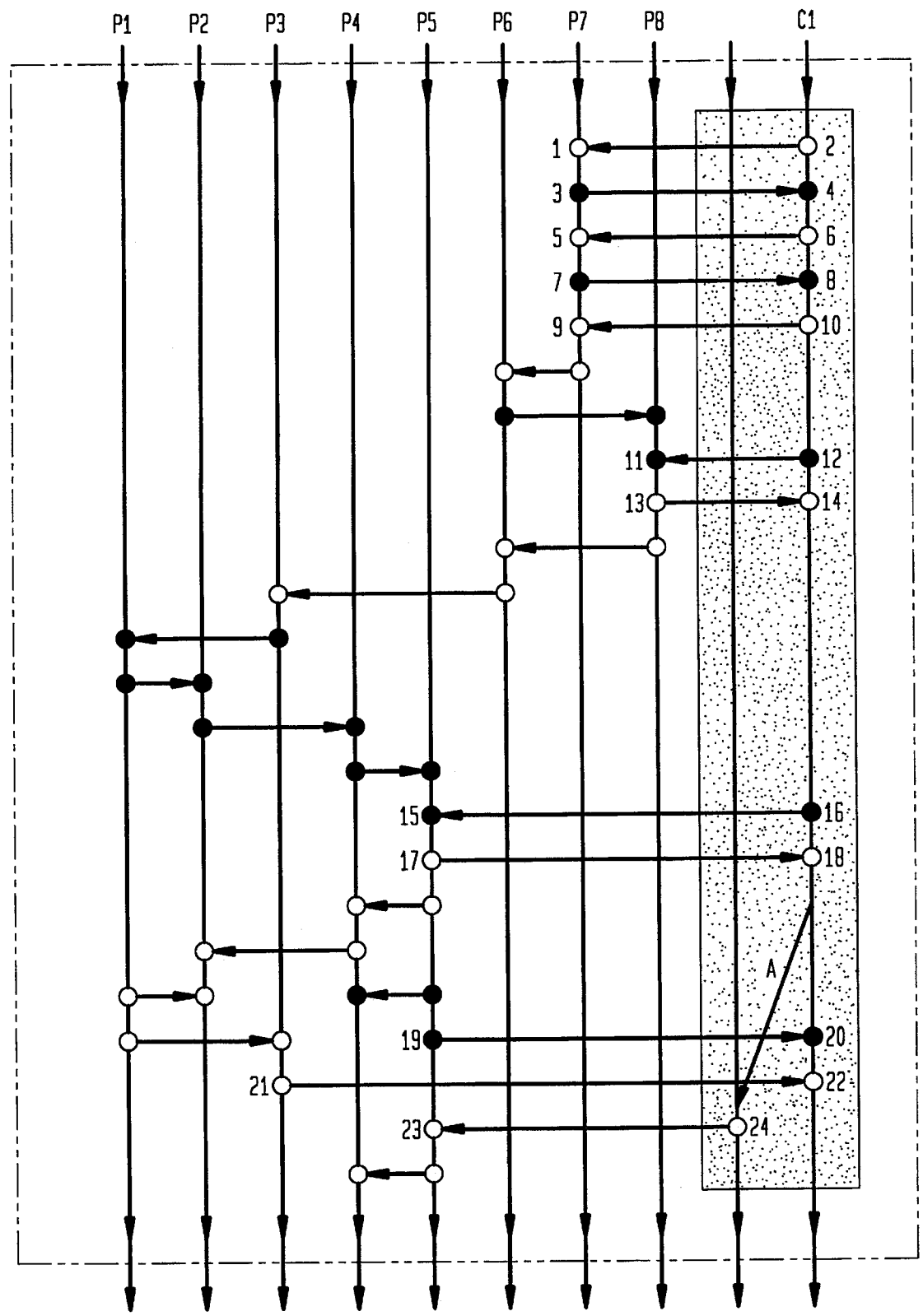
FIG. 16 shows the display of FIG. 15 wherein several processes have been combined into a cluster.

Another example of the effect of clustering is shown in FIG. 15 and FIG. 16. FIG. 15 shows display constructed in accordance with the present invention. In FIG. 16, processes P9 through P12 of FIG. 15 are grouped into cluster C1. In the preferred embodiment of the present invention, whenever one or more event pairs would overlap on the display (such as event pairs 21–22 and 23–24 in FIG. 15), one of these event pairs (23–24 in FIG. 15) is vertically shifted by a small fraction of the width of a display line in order to provide a clearer display.

When clustering is employed, it may be the case that overlap of events on the cluster line will occur. For example, in the example of FIG. 15, events 22 and 24 would overlap on the cluster line in C1 (the vertical line drawn on the display on which the events are placed). To avoid this, as shown in FIG. 16, a second cluster line is added to cluster C1 on the display to allow event 22 to be placed in a position on the display which does not overlap event 24. To indicate that more than one cluster line is included in a cluster, a shaded or colored background is provided behind the cluster lines of the cluster.

The implementation of clusters is achieved as follows. Once the user has identified (in any convenient manner as would be apparent to those of skill in the art) those processes which he wishes to form into a cluster, the display is constructed as described above with the following additional considerations. The sweep down operation forms S as described above and S is then modified prior to the determination of the set T.

The modification of S comprises the steps of considering each event in M which is in a process in a cluster to determine if the event is a unary event or if the event has a partner event in a process in the same cluster. In either case, S is modified by removing the event (or events) and the successor event(s) (assuming a sweep down) in the same process are considered for inclusion in S using the above-described inclusion criteria. The modification of S is performed each time after one or more new events have been included in S. When the modification and inclusion process is complete, set T is formed as described above.

To place the events in T (during a sweep down) on the display when clustering is employed, the following additional considerations are effected:

if an event z in T is from a process grouped in a cluster, then:

if there is no cluster line within the cluster which has a position at which z can be placed [i.e. z can be placed on a cluster line on the display if the line is empty (no events on it) or if the lowest displayed event on the line is a predecessor of z)], add a new cluster line to the cluster and place z on it;

else if only one cluster line in the cluster has a position at which z can be placed, place z on that one cluster line;

else if more than one cluster line in the cluster has a position at which z can be placed, examine each of these cluster lines to identify the cluster line, if any, whose immediately preceding event is from the same process as z and place z on that cluster line;

else if more than one cluster line in the cluster has a position at which z can be placed, a set is formed of all lines on which z may be placed and any cluster line whose bottom event is a predecessor of any other line in the set is removed from the set, z is placed on the leftmost cluster line remaining in the set.

Of course, while the above-mentioned steps refer to a sweep down operation, a sweep up operation is performed in the same manner, but with the reversal of the necessary parameters (i.e.—substitute top for bottom and succeeding for preceding).

The above-described considerations ensure that no process has a bottommost event on more than one cluster line. This constraint results in the desired result that, in the worst case, no more cluster lines will be displayed in a cluster than the number of processes within the cluster. The above-described steps also inhibit events of one process from 'wandering' back and forth across multiple cluster lines wherever possible (i.e.—if a cluster has two cluster lines and the cluster includes a long sequential series of events between one of its processes (e.g. P15) and a process (e.g. P20) outside of the cluster, the events of P15 in the series will be displayed on the same cluster line in the cluster. Of course, while this latter aspect of the steps is not required, it does result in a preferred display.

Figure 17A:
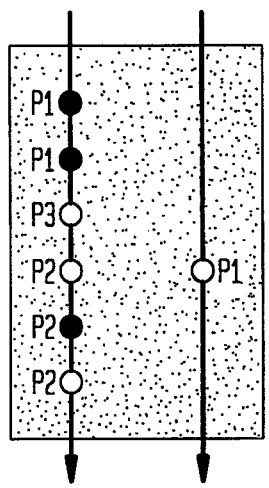
FIGS. 17a and 17b show an example of the reorganization of events on cluster lines prior to a change of sweep direction.

To maintain the minimum cluster line constraint and the preferred display, it is necessary to check and/or reorganize the placement of events on the cluster lines prior to performing a subsequent sweep operation in an opposite direction. FIG. 17a shows an example of why such a reorganization may be required. For clarity, in the Figure partner events in other processes and the arrows between the events of event pairs have been omitted and the events have merely been labelled to identify the process they belong to. It is clear from the Figure that while the bottommost event in each of the cluster lines is from a different process, this is not the case with the topmost event in the cluster lines as the topmost event in each cluster line is an event from process P1. Thus, a reorganization of the events must occur prior to performing a sweep up operation.

Assuming that the sweep direction is changing from down to up, the following steps will be performed to reorganize the display of the events on the cluster lines:

(i) if there are two or more cluster lines whose topmost event belongs to a process P, select two of these cluster lines (11, 12) and determine which one (11) of these cluster lines has the topmost event which precedes the topmost event of the other cluster line 12;

(ii) move each event in turn from cluster line 11 which belongs to p to cluster line 12 until all events are moved or until an event which is not from p is encountered;

(iii) repeat steps (i) and (ii) until no two cluster lines remain whose topmost events are from the same process.

Again, if the sweep direction is being changed from up to down, the same method for reorganizing is performed with the reversal of the necessary parameters (i.e. bottom for top, succeeding for preceding).

Figure 17B:
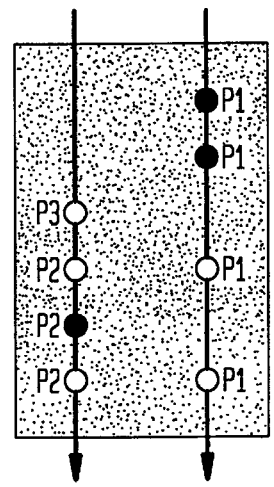

FIG. 17b shows the results of the reorganization of the cluster shown in FIG. 17a, prior to a sweep up operation. As is apparent, the top two events of the left cluster line in FIG. 17a have been moved to the right cluster line in FIG. 17b.

When clusters of processes are employed in the present invention, intervening events in some of the processes may be 'hidden' within the clusters and thus no longer displayed resulting in the situation that it may not be apparent to the user whether one event precedes another or whether the two events are merely concurrent. To assist the user in better understanding displays wherein clustering is employed, linking arrows may be provided to allow the user to establish which events on one cluster line are concurrent with those on another.

Figure 18:
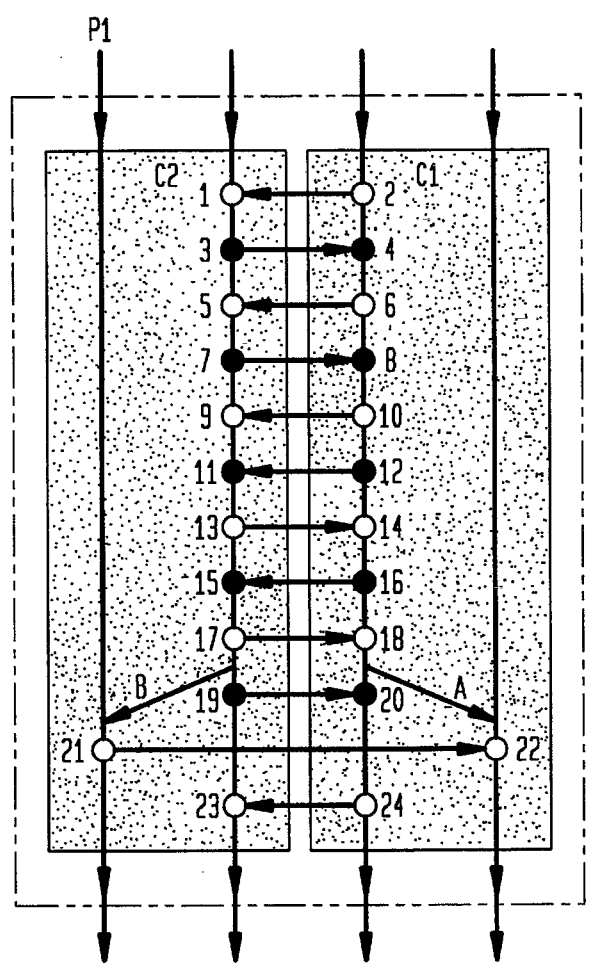
FIG. 18 shows the display of FIG. 16 wherein the unclustered processes in FIG. 16 are placed into a second cluster.

An example of a linking arrow is labelled A in FIG. 16. Arrow A indicates to the user which events on the right cluster line are concurrent with the single event on the left cluster line. Essentially, a path is provided from an event X to any succeeding event Y by tracing down a cluster line and/or across one or more link arrows. Link arrow A indicates that event 18 precedes event 24 which is concurrent with events 20 and 22 (i.e.—events 20 and 24 are concurrent and 20 is a predecessor to 22). FIG. 18 shows the resulting display when processes P1 through P8 of FIG. 16 are clustered into another cluster C2. In this example, two link arrows (A and B) are provided to indicate that event 21 is concurrent with events 19 and 23 and, similarly, event 22 is concurrent with events 20 and 24.

The provision of link arrows is accomplished, when the display has been created, through the following steps:

(i) for event x in a cluster, examine another cluster line in the same cluster to locate the lowest event X on the cluster line which precedes x;

(ii) if y exists and if y does not precede the event immediately above x on x's cluster line, then draw a link arrow from a point immediately below X to a point immediately above x;

(iii) repeat steps (i) and (ii) for each other cluster line in the cluster; and (iv) repeat step (iii) for each event in the cluster.

While these steps will produce a set of link arrows, in some cases more link arrows will be drawn than are required. For example, an arrow may be drawn from cluster line 1 to cluster line 2 and another arrow from cluster line 2 to cluster line 3 which implicitly indicates the link between cluster line 1 and cluster line 3 yet an explicit arrow will be drawn from cluster line i to cluster line 3. It has been determined however, that while a somewhat more cluttered display be obtained, these additional arrows result in a display which provides an advantage in that a user who is trying to determine the precedence of two events in a cluster need only search for a linking arrow between the two cluster lines of interest and need not attempt to trace those between other cluster lines.

The above-mentioned description has assumed that the display of the present invention is a video display terminal. Such devices are commonly available with many different display capabilities such as 50 or more horizontal lines of character display. Many video display terminals are capable of operating without a fixed number of character lines and such terminals are typically referred to as bit-mapped displays and allow user defined characters of various sizes to be displayed at any position on their screens. It will be apparent to those of skill in the art that where the present invention has referred to lines of the display, it is not intended to limit the use of the present invention to displays which are not bit-mapped and that the use of the term line contemplates any suitable alignment of characters on a display.

The embodiments of the invention in which an exclusive property or privilege is claimed are defined as follows:

1. A method of constructing a display of partially ordered information comprising a plurality of events, at least some of the plurality of events being related in a synchronous or asynchronous manner to form an event pair, each of the plurality of events being associated with one of a plurality of processes, the information being displayed on a display with opposed first and second boundaries, the method comprising the steps of:

(i) identifying and locating an event of interest on the display adjacent the first boundary, the first boundary defining a datum point in the partial order and the second boundary defining a traversal direction extending from the datum to the second boundary for traversing the partial order;

(ii) creating a set S to represent events to be considered for placement on the display and setting S to comprise the event of interest;

(iii) defining an operation direction equivalent to said traversal direction;

(iv) for each event in S, adding a partner event to S if: said partner event is a synchronous event or if said partner event is an asynchronous event succeeding said event in the partial order with respect to the operation direction and said partner event does not precede, with respect to the traversal direction, any first event on the previously completed display; and either the process to which the partner event is associated with is currently not in S or the event in said process already in S succeeds the partner event in the partial order with respect to the operation direction;

(v) determining events in S for which no other event in S precedes them in the partial order with respect to the operation direction and placing said events into a set T;

(vi) displaying each event in T on the display in the farthest position opposite said operation direction which is consistent with the partial order, the placement of each event in T being arranged to create a grouping of the displayed events associated with each process;

(vii) updating the contents of set S to remove each event also in set T and to replace each of those removed events in S with the event in the process associated with the removed event which succeeds the removed event in the partial order with respect to the operation direction, and removing all events from set T;

(viii) repeating steps (iv) through (vii) until the display cannot be further updated in the operation direction;

(ix) if the operation direction is opposite said traversal direction, repositioning in the operation direction each displayed event to the position within the grouping of events for its associated process which is closest said first boundary and is consistent with the partial order of the information;

(x) setting said operation direction to the opposite direction;

(xi) replacing the contents of S with: the set of events which immediately succeed, with respect to the direction of operation, the event in each process which is displayed furthest in the direction of operation; non-displayed asynchronous events which are the partner events of events already placed on the display and which succeed their displayed partner events with respect to the direction of operation when the operation direction is the traversal direction; and non-displayed asynchronous events which are the partner events of events already placed on the display and which succeed their displayed partner events with respect to the direction of operation but which do not precede, with respect to the traversal direction, any first event on the previously completed display when the operation direction is opposite the traversal direction; and wherein if two events from the same process are eligible to be placed in S, only the preceding event, with respect to the direction of operation, is placed in S;

(xii) repeating steps (iv) through (xi) until no events, which are associated with at least one process on the display for which no events had yet been displayed, are added to the display;

(xiii) determining the set of processes which are to be displayed and for which no events have yet been displayed;

(xiv) determining the subset of said set of processes whose previously displayed event in the position closest said first boundary cannot be displayed in compliance with said partial order;

(xv) replacing the contents of S with the first events succeeding, with respect to the traversal direction, each of said previously displayed events in said subset of events and which may be displayed according to the partial order;

(xvi) repeating steps (iii) through (xv) until set S is a null set;

(xvii) replacing the contents of S with the previously displayed event in the position closest said first boundary for each process in said set of processes formed in step (xiii);

(xviii) repeating steps (iii) through (viii).

2. The method according to claim 1 further including step (xix) wherein an arrow is placed on the display between the events of each displayed event pair, the direction of the arrow indicating the direction of communication between the events of the event pair.

3. The method according to claim 1 wherein the direction of operation is vertically orientated.

4. The method according to claim 1 wherein the direction of operation is horizontally orientated.

5. The method according to claim 1 wherein the identification and placement of the event of interest in step (i) is accomplished by user input through a mouse.

6. The method according to claim 5 wherein the position of groups of events associated with a process on the display is also selected with said mouse.

7. The method according to claim 1 wherein the identification and placement of the event of interest in step (i) is accomplished by user input from a keyboard.

8. The method according to claim 7 wherein the position of groups of events associated with a process on the display is also selected with said keyboard.

9. The method according to claim 1 wherein the identification and placement of the event of interest in step (i) is accomplished by input from a program.

10. The method according to claim 1 wherein step (i) further includes grouping two or more processes into a cluster, the events associated with the processes in the cluster being grouped onto one or more cluster lines; and step (iv) further comprises the steps of: (a) removing from S each event which is a unary event or which has a partner event in the same cluster; and (b) after each removal of an event from S, adding the successor of the removed event if it meets the criteria for the addition of partner events to S.

11. The method of claim 10 wherein step (vi) further includes, for each event in T which is associated with a cluster:

(a) if the event cannot be placed on a cluster line within the cluster, adding a new cluster line and placing the event on said new cluster line;

(b) if the event can be placed on only a single cluster line within the cluster, placing the event on that cluster line;

(c) if the event can be placed on at least two cluster lines within the cluster, placing the event on the cluster line, if any, whose preceding event, in the operation direction, is associated with the same process as said event; or (d) if the event can be placed on at least two cluster lines within the cluster, removing from consideration all of the at least two cluster lines whose farthest event, with respect to the operation direction, is a predecessor of the farthest event of another of the at least two cluster lines and placing the event on the remaining cluster line closest to a predefined side of the display.

12. The method according to claim 11 wherein step (x) comprises:

(a) reorganizing events in said cluster such that the first event, with reference to the operation direction, for each cluster line in a cluster is associated with a different process; and (b) setting the operation direction to the opposite direction.

13. The method according to claim 12 further including step (xix) wherein an arrow is placed on the display between the events of each displayed event pair, the direction of the arrow indicating the direction of communication between the events of the event pair and step (xx) wherein each first event on each cluster line in a cluster is examined in turn to determine if a second event exists on another cluster line in said cluster, said second event being the last event, with respect to said partial order, which precedes said first event but does not precede the event immediately preceding said first event on the cluster line of said first event and placing an arrow on said display extending from a point adjacent said second event to a point adjacent said first event.

14. The method of claim 1, further comprising the steps of:

(viii) replacing the contents of S with: the set of events which immediately succeed, with respect to a second operation direction opposite the initial operation direction, the event in each process which is displayed furthest in the second operation direction; and (ix) repeating steps (iii) through (vi) until the display cannot be further updated in the second operation direction.

15. A method of constructing a display of partially ordered information comprising a plurality of events, at least some of the plurality of events being related in a synchronous or asynchronous manner to form an event pair, each of the plurality of events being associated with one of a plurality of processes, the information being displayed on a display with opposed first and second boundaries where, in response to identification and location of an event of interest on the display adjacent the first boundary, the first boundary defining a datum point in the partial order and the second boundary defining a traversal direction extending from the datum to the second boundary for traversing the partial order, the method comprises the computer implemented steps of:

(i) creating a set S to represent events to be considered for placement on the display and setting S to comprise the event of interest;

(ii) defining an operation direction equivalent to said traversal direction;

(iii) for each event in S, adding a partner event to S if: said partner event is a synchronous event or if said partner event is an asynchronous event succeeding said event in the partial order with respect to the operation direction and said partner event does not precede, with respect to the traversal direction, any first event on the previously completed display; and either the process to which the partner event is associated with is currently not in S or the event in said process already in S succeeds the partner event in the partial order with respect to the operation direction;

(iv) determining events in S for which no other event in S precedes them in the partial order with respect to the operation direction and placing said events into a set T;

(v) displaying each event in T on the display in the farthest position opposite said operation direction which is consistent with the partial order, the placement of each event in T being arranged to create a grouping of the displayed events associated with each process;

(vi) updating the contents of set S to remove each event also in set T and to replace each of those removed events in S with the event in the process associated with the removed event which succeeds the removed event in the partial order with respect to the operation direction, and removing all events from set T;

(vii) repeating steps (iii) through (vi) until the display cannot be further updated in the operation direction;

(viii) if the operation direction is opposite said traversal direction, repositioning in the operation direction each displayed event to the position within the grouping of events for its associated process which is closest said first boundary and is consistent with the partial order of the information;

(ix) setting said operation direction to the opposite direction;

(x) replacing the contents of S with: the set of events which immediately succeed, with respect to the direction of operation, the event in each process which is displayed furthest in the direction of operation; non-displayed asynchronous events which are the partner events of events already placed on the display and which succeed their displayed partner events with respect to the direction of operation when the operation direction is the traversal direction; and non-displayed asynchronous events which are the partner events of events already placed on the display and which succeed their displayed partner events with respect to the direction of operation but which do not precede, with respect to the traversal direction, any first event on the previously completed display when the operation direction is opposite the traversal direction; and wherein if two events from the same process are eligible to be placed in S only the preceding event, with respect to the direction of operation, is placed in S;

(xi) repeating steps (iii) through (x) until no events, which are associated with at least one process on the display for which no events had yet been displayed, are added to the display;

(xii) determining the set of processes which are to be displayed and for which no events have yet been displayed;

(xiii) determining the subset of said set of processes whose previously displayed event in the position closest said first boundary cannot be displayed in compliance with said partial order;

(xiv) replacing the contents of S with the first events succeeding, with respect to the traversal direction, each of said previously displayed events in said subset of events and which may be displayed according to the partial order;

(xv) repeating steps (ii) through (xiv) until set S is a null set;

(xvi) replacing the contents of S with the previously displayed event in the position closest said first boundary for each process in said set of processes formed in step (xii);

(xvii) repeating steps (ii) through (vii).

16. A debugger for use with distributed systems comprising:

means for collecting and storing partially ordered event information including an identification of related events and associated processes;

means for constructing a display of events of a first portion of said information in accordance with said partial ordering;

means to select a second portion of said information; and means for reconstructing said display to display events of said second portion in accordance with said partial ordering.

17. A debugger according to claim 16 wherein said second portion is selected by identifying an event in said first portion and a boundary against which said selected event is to be placed.

18. A debugger according to claim 17 wherein said event is identified by a user.

19. A debugger according to claim 17 wherein said event is identified by a program.

20. A debugger according to claim 17 further including means to select an event from said display to display additional information relating to that event.

21. An event tracer for use with systems exhibiting concurrent processing characteristics, comprising:

means for collecting and storing partially ordered event information including an identification of related events and associated processes;

means for constructing a display of events of a first portion of said information in accordance with said partial ordering;

means to select a second portion of said information; and means for reconstructing said display to display events of said second portion in accordance with said partial ordering.

22. A display system to present a subset of information related to a plurality of partially ordered events to a user, comprising:

means for storing and recalling said information;

display means for presenting a constructed display to said user, said display means including opposed first and second boundaries;

means for selecting an event from said information;

means for indicating said selected event should be positioned adjacent one of said first and second boundaries;

means for determining which of said plurality of partially ordered events will comprise said subset to be displayed such that the events of said subset include said selected event and related events which may be displayed between said first and second boundaries in accordance with said partial order and in accordance with unidirectional movement, monotonicity, priority, maximal display and minimal change constraints;

means for constructing a display representing said subset.

23. A display system according to claim 22 wherein related events in a constructed display are arranged in at least one group.

24. A display system according to claim 23 including multiple groups, at least some of which are combined into a cluster and said constructed display only indicates events in said cluster which are associated with events in a group not in said cluster.

25. A display system according to claim 24 further comprising means for preventing combination of all groups in a single cluster.

26. A display system according to claim 24 further including means to assign a representative label to each said cluster.

27. A display system according to claim 23 further including means to assign a representative label to each said group.

28. A display system according to claim 22 further including means to select an event from said constructed display to receive additional information related to said event.

29. A display system according to claim 22 wherein said means for selecting an event is responsive to user input.

30. A display system according to claim 22 wherein said means for selecting an event is responsive to input from a program.

31. A display system according to claim 22 comprising removable data storage media.

32. A method of constructing a display of a subset of information related to a plurality of partially ordered events comprising the steps of:

storing and recalling said information;

selecting an event from said information;

indicating said selected event should be positioned adjacent one of first and second opposed boundaries on a display;

determining which of said plurality of partially ordered events will comprise said subset such that the events of said subset include said selected event and related events which may be displayed between said first and second boundaries in accordance with said partial order and in accordance with unidirectional movement, monotonicity, priority, maximal display and minimal change constraints;

constructing a display representing said subset.

33. The method of claim 32 wherein said step of selecting an event from said information is performed by a user.

34. The method of claim 32 wherein said step of selecting an event from said information is performed by a program.

35. The method of claim 32 further comprising the step of displaying related events in said subset in at least one group on said display.

36. The method of claim 35 further comprising the step of defining a cluster of two or more groups of events, said display only displaying events within said cluster which are associated with events not in said cluster.

37. The method of claim 36 wherein said clusters are defined by a user.

38. The method of claim 36 further including the step of assigning a label to said cluster.

39. The method of claim 36 further including the step of providing an indication of concurrency between elements in said cluster and associated events.

40. The method of claim 35 further including the step of assigning a label to said group.

41. A method of constructing a display of partially ordered information comprising a plurality of events, at least some of the plurality of events being related in a synchronous or asynchronous manner to form an event pair, each of the plurality of events being associated with one of a plurality of processes, the information being displayed on a display with opposed first and second boundaries where, in response to identification and location of an event of interest on the display adjacent the first boundary, the first boundary defining a datum point in the partial order and the second boundary defining a traversal direction extending from the datum point to the second boundary for traversing the partial order, the method comprising the steps of:

(i) creating a set S to represent events to be considered for placement on the display and setting S to comprise the event of interest;

(ii) defining an initial operation direction equivalent to the traversal direction;

(iii) for each event in S, adding a partner event to S if: said partner event is a synchronous event or if said partner event is an asynchronous event succeeding said event in the partial order with respect to the initial operation direction;

(iv) determining events in S for which no other event in S precedes them in the partial order with respect to the initial operation direction and placing said events into a set T;

(v) displaying each event in T on the display in the farthest position opposite the initial operation direction which is consistent with the partial order;

(vi) updating set S to remove each event placed in set T and to replace each of the removed events in S with the event in the process associated with the removed event which succeeds the removed event in the partial order with respect to the initial operation direction; and (vii) repeating steps (iii) through (vi) until the display cannot be further updated in the initial operation direction.

42. A method of displaying a plurality of partially ordered events, comprising the steps of:

(i) collecting and storing partially ordered event information including an identification of related events and associated processes;

(ii) constructing an initial display of partially ordered events based upon said partially ordered event information; and (iii) constructing a second display of partially ordered events based upon a selection of a portion of said initial display of partially ordered events, wherein the construction of said second display of partially ordered events is unconstrained by a fixed position of partially ordered events.

* * * * *